(12) United States Patent
Shiraki

(10) Patent No.: US 8,776,958 B2
(45) Date of Patent: Jul. 15, 2014

(54) BRAKE APPARATUS

(75) Inventor: Takahiro Shiraki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 42 days.

(21) Appl. No.: 13/201,076

(22) PCT Filed: Feb. 27, 2009

(86) PCT No.: PCT/JP2009/053686
§ 371 (c)(1),
(2), (4) Date: Aug. 11, 2011

(87) PCT Pub. No.: WO2010/097938
PCT Pub. Date: Sep. 2, 2010

(65) Prior Publication Data
US 2011/0308898 A1 Dec. 22, 2011

(51) Int. Cl.
*F16D 65/20* (2006.01)
*F16D 65/21* (2006.01)
*F16D 55/226* (2006.01)

(52) U.S. Cl.
USPC ........ 188/72.4; 188/71.1; 188/71.9; 188/72.1; 188/72.6; 188/72.8; 188/158; 188/163; 188/196 V; 188/265

(58) Field of Classification Search
CPC .................................................. F16D 2121/14
USPC ......... 188/72.4, 72.1, 72.7, 72.8, 106 F, 72.6; 303/89
See application file for complete search history.

(56) References Cited

U.S. PATENT DOCUMENTS 3,920,103 A * 11/1975 Haraikawa .................... 188/71.9
4,779,711 A * 10/1988 Fabbro et al. ............. 188/196 D
(Continued)

FOREIGN PATENT DOCUMENTS

| DE | 195 21 634 A1 | 12/1996 |
| DE | 196 40 995 A1 | 4/1998 |

(Continued)

OTHER PUBLICATIONS

English Translation of the International Preliminary Report on Patentability (Chapter II of the Patent Cooperation Treaty) issued on Aug. 27, 2011 in PCT/JP2009/053686 filed Feb. 27, 2009.

(Continued)

*Primary Examiner* — Robert A Siconolfi
*Assistant Examiner* — San Aung
(74) *Attorney, Agent, or Firm* — Oblon, Spivak, McClelland, Maier & Neustadt, L.L.P.

(57) ABSTRACT

A brake apparatus for restraining rotation of a wheel of a vehicle by application of a brake that is to be activated for causing a friction member, to be pressed against a brake rotor, through a piston that is movable in an axial direction of the piston. The brake apparatus includes: (a) a power drive device; (b) a driven member that is to be moved, by the power drive device, relative to the piston in the axial direction; and (c) an engaging portion that is provided in one of the driven member and the piston, such that the piston is held in engagement with the driven member through the engaging portion. The engaging portion is disposed such that, during release of the application of the brake, the piston is movable rearwardly while being held in engagement with the driven member through the engaging portion.

13 Claims, 13 Drawing Sheets

(56) References Cited

U.S. PATENT DOCUMENTS

| | | | |
|---|---|---|---|
| 5,148,894 A * | 9/1992 | Eddy, Jr. ...................... | 188/72.6 |
| 6,053,289 A * | 4/2000 | Bauer et al. .................. | 188/71.9 |
| 6,394,235 B1 | 5/2002 | Poertzgen et al. | |
| 2003/0042084 A1* | 3/2003 | Kawase et al. ............... | 188/72.1 |
| 2005/0258682 A1 | 11/2005 | Halasy-Wimmer et al. | |
| 2007/0062769 A1* | 3/2007 | Noh .............................. | 188/265 |
| 2007/0164602 A1* | 7/2007 | Haffelder et al. ................. | 303/3 |
| 2007/0267255 A1* | 11/2007 | Inagaki et al. ............... | 188/72.4 |
| 2008/0053760 A1* | 3/2008 | Oikawa et al. ............... | 188/72.4 |
| 2008/0283345 A1* | 11/2008 | Balz et al. .................... | 188/72.6 |

FOREIGN PATENT DOCUMENTS

| | | |
|---|---|---|
| DE | 197 32 168 C1 | 1/1999 |
| DE | 102 39 793 A1 | 3/2003 |
| DE | 10 2005 058 355 A1 | 6/2006 |
| DE | 10 2006 037 660 A1 | 7/2007 |
| DE | 10 2006 040 129 A1 | 1/2008 |
| JP | 2000 130482 | 5/2000 |
| JP | 2001 510760 | 8/2001 |
| JP | 2003 254365 | 9/2003 |
| JP | 2004 218714 | 8/2004 |
| JP | 2005 186734 | 7/2005 |
| JP | 2005 233224 | 9/2005 |
| JP | 2005 539189 | 12/2005 |
| JP | 2006 528312 | 12/2006 |
| WO | 00/61962 | 10/2000 |
| WO | WO 2006/061413 | 6/2006 |

OTHER PUBLICATIONS

International Search Report issued Mar. 24, 2009 in PCT/JP09/53686 filed Feb. 27, 2009.

* cited by examiner

1. IN CASE OF NON-ACTIVATION OF BRAKE

2. IN CASE OF ACTIVATION OF SERVICE BRAKE

3. IN CASE OF LOCKING OF PARKING BRAKE 4-1. PARKING RELEASE WITH FLUID-PRESSURE-ABSENCE MODE (a) REARWARD MOVEMENTS OF PISTON & NUT MEMBER IN INTEGRATION WITH EACH OTHER (b) REARWARD MOVEMENT OF NUT MEMBER WITH NO LOAD (c) RETRACTION OF PISTON 4-2. PARKING RELEASE WITH FLUID-PRESSURE-ABSENCE MODE
(REATTEMPTING CONTROL)

(a) CONTACT OF PISTON WITH STOPPER (b) STOP OF ELECTRIC MOTOR (M1)

(c) STOP OF ELECTRIC MOTOR (M2)

4-3. PARKING RELEASE WITH FLUID-PRESSURE-PRESENCE MODE
(STATE OF REARWARD MOVEMENT OF ONLY NUT MEMBER)

US 8,776,958 B2

BRAKE APPARATUS

TECHNICAL FIELD

The present invention relates to a built-in brake apparatus.

BACKGROUND ART

Patent literatures 1 and 2 disclose built-in disk brake apparatuses. In each of the brake apparatuses disclosed in Patent literatures 1 and 2, a service brake is activated when a piston is moved forwardly by a fluid pressure in a brake cylinder, while a parking brake is activated when the piston is forwardly moved by forward movement of a nut member which is caused by an electric motor.

PRIOR ART LITERATURES

Patent Literatures

[Patent Literature 1] JP-2005-539189A
[Patent Literature 2] JP-2001-510760A

DISCLOSURE OF THE INVENTION

Object to be Achieved by the Invention

An object of the present invention is to improve built-in brake apparatus.

Measures for Achieving the Object and Effect

A brake apparatus recited in claim 1 is a brake apparatus for restraining rotation of a wheel of a vehicle by application of a brake that is to be activated for causing a friction member held by a non-rotatable body, to be pressed against a brake rotor that is to be rotated together with the wheel, through a piston that is movable in an axial direction of the piston. This brake apparatus includes: (a) a power drive device; (b) a driven member that is to be relatively moved, by the power drive device, in the axial direction; and (c) an engaging portion that is provided in one of the driven member and the piston, such that the piston is held in engagement with the driven member through the engaging portion.

The above-described engaging portion is disposed such that, during release of the application of the brake, the piston is movable rearwardly while being held in engagement with the driven member through the engaging portion.

The engaging portion enables or allows the piston to be rearwardly moved to a desired position. Consequently, it is possible to prevent dragging of the friction member on the brake rotor and also to restrain delay in response of the brake.

The phrase that "the engaging portion is disposed such that, during release of the application of the brake, the piston is movable rearwardly while being held in engagement with the driven member through the engaging portion" may be interpreted to mean that the engaging portion is disposed such that the piston is movable rearwardly together with rearward movement of the driven member and/or such that the piston is movable rearwardly relative to the driven member. The state that the piston is movable rearwardly relative to the driven member includes, for example, a state that, when the driven member is being stopped, the piston is movable rearwardly to a position that is dependent on the driven member.

The engaging portion may be provided in either the driven member or the piston.

The power drive device may include, for example, a power drive source such as an electric motor.

CLAIMABLE INVENTION

There will be described various modes of the invention deemed to contain claimable features for which protection is sought. Hereinafter, the invention deemed to contain the claimable features will be referred to as "claimable invention" where appropriate. The claimable invention includes at least "the present invention" or "the invention of the present application" which is an invention described in claims, and could include also specific concept of the invention of the present application, generic concept of the invention of the present application and other concept of the invention of the present application. Each of these modes of the invention is numbered like the appended claims and depends from the other mode or modes, where appropriate, for easier understanding of the technical features disclosed in the present specification. It is to be understood that the claimable invention is not limited to the technical features or any combinations thereof which will be described in each of these modes. That is, the scope of the claimable invention should be interpreted in the light of the following descriptions accompanying the various modes and preferred embodiments of the invention. In a limit in accordance with such an interpretation, a mode of the claimable invention can be constituted by not only each one of these modes but also either a mode provided by any one of these modes and additional components incorporated therein or a mode provided by any one of these modes without some of components recited therein.

(1) A brake apparatus for restraining rotation of a wheel of a vehicle by application of a brake that is to be activated for causing a friction member held by a non-rotatable body, to be pressed against a brake rotor that is to be rotated together with the wheel, through a piston that is movable in an axial direction of the piston, the brake apparatus being characterized by including:

a power drive device;

a driven member that is to be relatively moved, by the power drive device, in the axial direction; and an engaging portion that is provided in one of the driven member and the piston, such that the piston is held in engagement with the driven member through the engaging portion, wherein the engaging portion is disposed such that, during release of the application of the brake, the piston is movable rearwardly while being held in engagement with the driven member through the engaging portion.

(2) The brake apparatus according to mode (1), comprising another drive device in addition to the power drive device, wherein the piston is to be activated by a driving force of the another drive device.

The piston is to be activated by the above-described another drive device that is other than the power drive device that is configured to activate the driven member.

The another drive device may be constituted by, for example, (a) a drive device including a fluid pressure source and a brake cylinder or (b) a drive device including another electric motor. The fluid pressure source may be constituted by a fluid pressure source including (i) a master cylinder that is to be caused, by operation of a brake operating member by a vehicle operator, to generate a fluid pressure and/or (ii) a power fluid pressure source such as a pump device that is capable of generating a fluid pressure without operation of the brake operating member by the vehicle operator.

Further, the power drive device may be arranged to activate a parking brake while another drive device may be arranged to activate a service brake.

(3) The brake apparatus according to mode (1) or (2),
wherein the engaging portion includes a spring that is held by the one of the driven member and the piston,
the brake apparatus including an engaged portion which is provided in the other of the driven member and the piston and which is to be engaged with the spring,
wherein the piston is allowable, by elastic deformation of the spring that is to be caused upon contact of the engaged portion with the spring, to be moved forwardly relative to the driven member.

The forward movement of the piston relative to the driven member is allowed by elastic deformation of the spring. Therefore, even where the piston and the driven member are to be activated by respective drive devices different from each other, independently of each other, the piston can be rapidly moved forwardly. For example, in a process of releasing of application the parking brake, the piston can be moved forwardly whereby the service brake can be activated.

It is noted that the engaged portion and the spring may be disposed such that the engaged portion and the spring can be brought into direct contact with each other or such that the engaged portion and the spring can be brought into indirect contact with each other. Where the engaged portion and the spring can be brought into indirect contact with each other, they can be brought into contact with each other via a movable retainer (e.g., washer) that is interposed therebetween.

(4) The brake apparatus according to any one of modes (1)-(3), including an engaged portion which is provided in the other of the driven member and the piston and which is to be engaged with the engaging portion,
wherein the engaged portion is spaced apart from the engaging portion by a clearance in the axial direction, when the driven member and the piston are brought into contact with each other as a result of relative movement of the driven member and the piston in the axial direction.

Since there exists a clearance between the piston and the driven member in the axial direction, a relative movement of the driven member and the piston within the clearance is allowed.

(5) The brake apparatus according to any one of modes (2)-(4),
wherein the piston and the driven member overlap with each other in a radial direction of the piston,
and wherein the engaged portion, which is provided in the other of the driven member and the piston, protrudes in the radial direction.

Where the engaging portion is provided in one of the piston and the driven member which is located on a radially inner side of the other of the piston and the driven member, the engaged portion is provided in the other of the piston and the driven member which is located on a radially outer side of the one of the piston and the driven member, such that the engaged portion protrudes inwardly in the radial direction. Where the engaging portion is provided in the above-described other of the piston and the driven member, the engaged portion is provided in the above-described one of the piston and the driven member, such that the engaged portion protrudes outwardly in the radial direction.

The piston may be disposed on either the radially inner side or radially outer side of the driven member, while the driven member may be disposed on either the radially inner side or radially outer side of the piston.

It is noted that the engaged portion does not necessarily have to protrude in the radial direction. Embodiment 4 is an example in which the engaged portion does not protrude in the radial direction.

(6) The brake apparatus according to any one of modes (1)-(5),
wherein the one of the driven member and the piston includes (a) a fixed retainer fixedly provided in the one of the driven member and the piston, (b) a movable retainer provided to be movable relative to the one of the driven member and the piston, and (c) a set-load defining portion which is fixedly provided in the one of the driven member and the piston and which is configured to define a limit of movement of the movable retainer relative to the one of the driven member and the piston,
and wherein the spring is disposed between a pair of retainers consisting of the fixed retainer and the movable retainer.

(7) The brake apparatus according to any one of modes (1)-(6),
wherein the one of the driven member and the piston includes (a) a fixed retainer fixedly provided in the one of the driven member and the piston, (b) a set-load defining portion which is fixedly provided in a position that is distant from the fixed retainer in the axial direction, and (c) a movable retainer which is provided between the fixed retainer and the set-load defining portion and which is movable relative to the one of the driven member and the piston,
and wherein the spring is disposed between a pair of retainers consisting of the fixed retainer and the movable retainer.

The set-load defining portion may be provided in one of the piston and the driven member, so as to be disposed either in a position which is distant from the fixed retainer and which is located on a front side of the fixed retainer or in a position which is distant from the fixed retainer and which is located on a rear side of the fixed retainer.

It is noted that, although the provision of the movable retainer is not essential, the provision of the movable retainer makes it possible to more satisfactorily establish the engagement of the engaging portion and the engaged portion and also makes it possible to more steadily apply a force to the spring.

(8) The brake apparatus according to any one of modes (1)-(6),
wherein the one of the driven member and the piston includes (a) a fixed retainer fixedly provided in the one of the driven member and the piston and (b) a movable-retainer holding portion holding a movable retainer, the movable-retainer holding portion being provided to straddle the fixed retainer and movable relative to the one of the driven member and the piston,
and wherein the spring is disposed between a pair of retainers consisting of the fixed retainer and the movable retainer.

The movable-retainer holding portion is constituted by a member which extends in the axial direction and which is movable relative to the above-described one of the driven member and the piston. The movable-retainer holding portion has the movable retainer and a retainer engaging portion which are located on one and the other sides of the fixed retainer, respectively. The limit of movement of the movable retainer relative to the driven member is defined in a state in which the retainer engaging portion is in contact with the fixed retainer. In this case, the set-load defining portion is constituted by the retainer engaging portion and the fixed retainer.

(9) The brake apparatus according to any one of modes (6)-(8), wherein the spring has a certain value of set load in a state in which the limit of the movement of the movable retainer is defined by the set-load defining portion, such that the certain value of set load is large enough to avoid the spring from being elastically deformed in an assumed case where the piston is moved rearwardly together with rearward movement of the driven member, and wherein the fixed retainer, the set-load defining portion, the movable retainer and the spring cooperate with one another to constitute the engaging portion.

The value of the set load given to the spring is so large that the spring is avoided from being elastically deformed when the piston is assumed to be moved rearwardly together with the rearward movement of the driven member. That is, the certain value of set load is large enough to avoid the spring from being elastically deformed when the piston is assumed to be moved rearwardly together with the rearward movement of the driven member in the state (hereinafter will be referred to as a static state of the spring) in which the limit of the movement of the movable retainer is defined by the set-load defining portion.

In the brake apparatus recited in this mode (9), when the driven member is being moved rearwardly, the spring is kept elastically deformable whereby the piston is allowable to be moved forwardly. Consequently, it is possible to avoid elastic deformation (compression) of the spring during the rearward movement of the driven member, and avoid the piston from being disabled to be moved forwardly, so that the spring is compressed upon application of a forward force to the piston whereby the piston can be rapidly moved forwardly owing to the compression of the spring. The spring is in the static state not only when the driven member is being moved rearwardly but also when the driven member is being stopped. Thus, the piston can be moved forwardly by compression of the spring when the driven member is being stopped.

It is noted that, in an arrangement in which the piston is slidably fitted in the cylinder main body, the certain value of set load may be not smaller than a value of load that is dependent on a sliding resistance to be generated between the piston and the cylinder main body.

The term "avoiding the spring from being elastically deformed" does not mean that an amount of elastic deformation of the spring is necessarily zero. Rather, this term means that the arrangement of the spring is designed such that the elastic deformation of the spring is avoided. Therefore, this term encompasses a case where the spring is elastically deformed due to variation among individual springs. That is, the spring may be elastically deformed by a small amount that allows the piston to be moved forwardly.

(10) The brake apparatus according to any one of modes (1)-(9), wherein the piston is slidably fitted in a cylinder main body that constitutes a part of a caliper, and wherein the brake is a built-in disk brake.

(11) The brake apparatus according to any one of modes (1)-(10), wherein the power drive device includes (a) an electric motor and (b) a motion converting mechanism configured to convert a rotary motion of the electric motor into a linear motion of the driven member, the brake apparatus including:

an electric current sensor configured to detect a value of an electric current flowing through the electric motor; and an electric-motor control device configured to control activation of the driven member, by controlling the electric motor on the basis of the value of the electric current detected by the electric current sensor.

(12) The brake apparatus according to any one of modes (1)-(11), wherein the power drive device includes (a) an electric motor and (b) a motion converting mechanism configured to convert a rotary motion of the electric motor into a linear motion of the driven member, the brake apparatus including an electric-motor control device that is configured to control activation of the driven member, by controlling the electric motor on the basis of a number of rotations of the electric motor.

(13) The brake apparatus according to any one of modes (1)-(12), wherein the power drive device includes (a) an electric motor and (b) a motion converting mechanism configured to convert a rotary motion of the electric motor into a linear motion of the driven member, and wherein the piston is to be activated by a fluid pressure in a brake cylinder, the brake apparatus including: a brake-fluid-pressure sensor that is configured to detect a value of the fluid pressure in the brake cylinder; and an electric-motor control device that is configured to control activation of the driven member, by controlling the electric motor on the basis of the value of the fluid pressure detected by the brake-fluid-pressure sensor.

The position of the driven member relative to the piston can be obtained based on the electric current flowing through the electric motor. The position of the driven member relative to the cylinder main body can be obtained based on the number of rotations of the electric motor. The position of the piston relative to the cylinder main body can be obtained based on the fluid pressure in the brake cylinder.

Therefore, the activation of the driven member can be satisfactorily controlled, by controlling the activation of the driven member, on the basis of, for example, the electric current flowing through the electric motor, the number of rotations of the electric motor and the fluid pressure in the brake cylinder.

The motion converting mechanism may be constituted by a mechanism having a screw mechanism, for example. The screw mechanism may be provided with a locking function.

Where the parking brake is activated by activation of the driven member, the electric-motor control device constitutes a parking-brake control device.

(14) The brake apparatus according to mode (13), wherein the piston is to be activated by a fluid pressure in a brake cylinder, and wherein the electric-motor control device includes a forward-movement controlling portion that is configured, during a forward movement of the driven member, to control the electric motor such that the driven member is moved until the value of the electric current detected by the electric current sensor reaches a target electric current value that is determined based on the fluid pressure in the brake cylinder and a required parking brake force required for maintaining a stop state of the vehicle, and such that the driven member is stopped when the value of the electric current has reached the target electric current value.

When the parking brake is to be activated in a state in which the fluid pressure in the brake cylinder is not lower than a given pressure value (i.e., value high enough to make it possible to regard that the service brake is in its activated state), a force dependent on the fluid pressure and a force dependent on the driving force are applied to the piston. The piston applies a pressing force (i.e., sum of the these forces) to the friction member, whereby the friction member is forced against the disk rotor. Thus, a braking force as a sum of the force dependent on the fluid pressure and the force dependent on the driving force is applied to the wheel. Further, even when the supply of the electric current to the electric motor is stopped, and/or even when the fluid pressure in the brake cylinder becomes lower than the given pressure value, the pressing force, i.e., the braking force can be maintained owing to the locking mechanism of the parking brake.

As is clear from this fact, a target electric current value (i.e., target value of electric current), which is to be supplied to the electric motor, may be determined, such that the target electric current value is set to a value dependent on a required parking brake force when the parking brake is to be activated in a state in which the fluid pressure in the brake cylinder is lower than the given pressure value, and such that the target electric current value is set to a value equal to the required parking brake force when the parking brake is to be activated in a state in which the fluid pressure in the brake cylinder is not lower than the given pressure value. Thus, a relative positional relationship between the driven member and the friction member is constant irrespective of whether the fluid pressure in the brake cylinder is present or absent.

It is noted that the required parking brake force may be set to a predetermined value or a value that is dependent on, for example, a degree of inclination of a road surface on which the vehicle is being stopped.

(15) The brake apparatus according to mode (13) or (14),
wherein the piston is to be activated by a fluid pressure in a brake cylinder,
and wherein the electric-motor control device is configured, during a rearward movement of the driven member, to control the electric motor in a mode or manner that varies depending upon whether or not a value of the fluid pressure in the brake cylinder is higher than a given pressure value.

When the application of the parking brake is to be released, the driven member is activated in a mode or manner that varies depending on whether or not the service brake is in its activated state.

When the service brake is in its activated state, it is desirable that the driven member is caused to be moved rearwardly by a given stroke distance from a position that activates the parking brake. Where the position of the driven member relative to the friction member in the activated state of the parking brake is constant as described above, a rearwardly moved position, in which the driven member is to be positioned as a result of a rearward movement of the driven member by a certain stroke distance, is located in a more front position when an amount of wear of the friction member is large, than when the amount of wear of the friction member is small. The given stroke distance may be a predetermined fixed value.

When the service brake is in its non-activated state, the driven member can be moved rearwardly to the rearwardly moved position that is determined by taking account of reduction of the restoring force that is caused as a result of increase of the amount of the wear of the friction member. It is therefore possible to more satisfactorily prevent dragging of the friction member on the brake rotor and also to restrain delay in response of the brake.

Hereinafter, there will be described a control of the electric motor in a case where the fluid pressure in the brake cylinder is not higher than the given pressure value (i.e., in a case where the service brake is in its non-activated state).

(16) The brake apparatus according to any one of modes (11)-(15), wherein the electric-motor control device includes a retraction-movement controlling portion that is configured, during a rearward movement of the driven member, to control the electric motor, such that the driven member is moved rearwardly by a given first stroke distance from a point of time at which the driven member and the piston are brought into engagement with each other through the engaging portion, and such that the driven member is stopped after having been moved rearwardly by the given first stroke distance.

In an arrangement in which the piston is to be activated by the fluid pressure in the brake cylinder while the brake is constituted by a disk brake, when the brake is activated by a forward movement of the piston owing to the fluid pressure in the brake cylinder during the non-activated state of the electric motor, a pad (friction member), a caliper and a piston seal are elastically deformed by the fluid pressure. Therefore, upon release of the brake, the piston is moved rearwardly by restoring forces of the pad, caliper and piston seal, so that it is not common that the brake dragging and the delay in response of the brake are not caused.

However, the piston seal is to be elastically deformed by the driving force (dependent on the fluid pressure) that is applied to the piston and the fluid pressure that is applied to the piston seal, so that the piston seal is not elastically deformed by a sufficient amount (namely, the amount of elastic deformation of the piston seal relative to an amount of the forward movement of the piston is insufficient), (i) when the parking brake is activated without generation of the fluid pressure, i.e., when the piston is moved forwardly by the driven member (i.e., by the driving force of the electric motor) and (ii) when the piston is further moved forwardly by the driven member after having been moved forwardly by the driven member, i.e., when the parking brake is activated during the activated state of the service brake. When the piston seal is not elastically deformed by a sufficient amount, the piston cannot be returned sufficiently upon release of the brake, whereby the brake dragging could be caused.

On the other hand, by using the driven member, upon release of the parking brake, it is possible to cause the piston to be moved rearwardly to a position that avoids the brake dragging.

The piston is stopped in a stop position, after having been moved rearwardly by the restoring forces (hereinafter referred to as restoring forces of the elastic members such as the pad) that are caused by, for example, the elastic deformations of the pad, caliper and piston seal. Therefore, the brake dragging can be prevented by causing the piston to be moved rearwardly further from the stop position by a stroke distance that can be determined based on a shortage of the restoring force of the piston seal.

In view of this fact, the given first stroke distance can be set to a value that is determined based on a shortage of distance of the rearward movement of the piston which is caused by the insufficiency of the elastic deformation of the piston seal.

Further, the given first stroke distance may be (i) a predetermined value, (ii) a value determined based on the electric current (parking brake force) supplied to the electric motor, or (iii) a value determined based on the fluid pressure in the brake cylinder upon the forward movement of the driven member. Where the given first stroke distance is (ii) the value determined based on the supplied electric current or (iii) the value determined based on the fluid pressure, it is possible to obtain a distance corresponding to the shortage of distance of the rearward movement of the piston which shortage is caused by the insufficiency of the elastic deformation of the piston seal. Further, the given first stroke distance may be a value that is determined by taking account of a part of the elastic deformation which is not immediately restored, due to viscosity of the pad.

On the other hand, the piston is stopped in a stop position, after having been moved rearwardly by the restoring forces of the elastic members such as the pad. This stop position is located in a more front position when an amount of wear of the pad is large, than when the amount of wear of the pad is small, because an amount of returning of the piston is reduced with a reduction of thickness of the pad per se as a result of an increase of amount of wear of the pad and a reduction of the restoring force of the pad as a result of the increase of amount of wear of the pad. On the other hand, the driven member causes the piston to be moved rearwardly further from the above-described stop position, by the given first stroke distance. Consequently, the piston can be moved rearwardly to a position that is dependent on the amount of wear of the pad, whereby the delay in response of the brake can be satisfactorily restrained.

(17) The brake apparatus according to mode (16), wherein the retraction-movement controlling portion includes a retraction-start detecting portion that is configured to detect that the driven member and the piston have been brought into engagement with each other through the engaging portion, when the value of the electric current detected by the electric current sensor has been increased by at least a given first width.

The piston is moved rearwardly owing to the restoring forces of the elastic members such as the pad, and is then stopped in the stop position. On the other hand, when the driven member is brought into contact with the piston after having been moved rearwardly by the power drive device, the load applied to the electric motor is increased whereby the electric current flowing through the electric motor is increased. It is noted that, where the set load of the spring is larger than a load that corresponds to the sliding resistance applied to the piston, the electric current flowing through the electric motor is held substantially constant during the retraction movement of the piston.

In view of this fact, it is possible to detect that the driven member has been brought into contact with the stopped piston when the electric current has been increased by at least the given first width during the rearward movement of the driven member. The given first width may be determined based on a width of increase of the electric current that is dependent on an increase of the load applied to the electric motor, which increase is caused as a result of contact of the driven member with the piston.

(18) The brake apparatus according to any one of modes (11)-(17), wherein the engaged portion which is provided in the other of the driven member and the piston is disposed such that, in a state in which the driven member and the piston are in contact with each other, the engaged portion and the engaging portion cooperate with each other to define a clearance therebetween in the axial direction, and wherein the electric-motor control device includes a no-load rearward-movement detecting portion that is configured, during a rearward movement of the driven member, to detect that there is being established a no-load rearward-movement state in which the driven member is moved, within the clearance, rearwardly relative to the piston while the piston is being stopped.

(19) The brake apparatus according to mode (18), wherein the no-load rearward-movement detecting portion includes an electric-current-value-basis detecting portion configured to detect that there is being established the no-load rearward-movement state in which the driven member is moved relative to the piston without a load being applied to the electric motor, when at least one of four conditions is satisfied, the four conditions consisting of (a) a condition that a rate of reduction of the value of the electric current detected by the electric current sensor has become not higher than a given first rate, (b) a condition that the detected value is not higher than a given first value, (c) a condition that an amount of change of the detected value is within a given first range, and (d) a condition that the no-load rearward-movement state has been continued for at least a given first time.

As described in detail in the below-described embodiments, upon release of the parking brake, the piston is moved rearwardly by the restoring forces of the elastic members such as the pad, while the drive member is moved rearwardly by activation of the electric motor, such that the driven member and the piston are moved rearwardly integrally with each other. On the other hand, where the motion converting mechanism has the locking mechanism, the electric motor is not rotated by a force applied to the driven member from the piston, and the force applied to the driven member constitutes a load acting on the electric motor. Therefore, while the piston and the driven member are being moved integrally with each other, the large electric current flows through the electric motor. However, the pressing force applied to the rotor from the pad is reduced with the rearward movement of the piston, so that the reaction force applied from the piston to the driven member is reduced whereby the load applied to the electric motor is reduced and accordingly the electric current flowing though the electric motor is also reduced.

Thereafter, when the driven member is moved rearwardly relative to the piston within the clearance after the piston has been stopped, the load applied to the electric motor is made considerably low, whereby the electric current flowing through the motor is made considerably low. Further, fluctuation of the electric current is made small, and such a low-load state is continued.

Since this low-load state in which the load applied to the electric motor is considerably low can be regarded substantially as a no-load state, this state will be simply referred to as the no-load state.

In view of this fact, (a) in a case in which the rate of the reduction of the electric current flowing through the electric motor is abruptly reduced, it is possible to detect that the driven member has started to be moved rearwardly relative to the piston in the no-load state. The given first rate may be set to a value that makes it possible to regard that a state in which the driven member is moved rearwardly integrally with the piston has been switched to a state in which the driven member is moved rearwardly relative to the piston.

In view of that fact, (b) in a case in which the electric current flowing through the electric motor is not higher than the given first value, it is possible to detect that the electric motor is in the no-load state. The given first value is a value that makes it possible to regard that the load applied to the electric motor is extremely low, and may be set to a value close to zero.

In view of that fact, (c) in a case in which the amount of change of the electric current flowing through the electric motor is within the given first range, it is possible to detect that the electric motor is in the no-load state. The given first range may be set to a range that makes it possible to regard that the amount of change of the electric current is extremely small.

In view of that fact, (d) the electric motor is in the no-load state when the driven member is being moved, within the clearance, relative to the piston. Therefore, the given first time may be determined based on a distance of the clearance in the axial direction (i.e., 1/n of the distance) and a rotational velocity of the electric motor.

On the other hand, in the brake apparatus described in this mode (19), since the driven member is caused to be brought into contact with the piston after the electric motor has been placed into the no-load state, it is possible to satisfactorily detect an increase of the electric current, namely, to satisfactorily detect that the electric current has been increased as a result of contact of the driven member with the piston.

(20) The brake apparatus according to any one of modes (11)-(19), wherein the cylinder main body includes a stopper that defines a rearward end position of the piston, and wherein the electric-motor control device includes a reattempt controlling portion that is configured, during the release of the application of the braking, to control the electric motor such that a rotational direction of the electric motor is inverted upon contact of the piston with the stopper and such that the driven member is stopped after separation of the piston from the stopper.

When the piston is moved rearwardly to be brought into contact with the stopper, there is a risk that the response of the brake could be delayed although the brake dragging could be satisfactorily prevented. Therefore, when the contact of the piston with the stopper is detected, the electric motor is controlled for correcting the position of the driven member.

(21) The brake apparatus according to mode (20), wherein the reattempt controlling portion includes a stopper-contact detecting portion that is configured to detect that the piston has been brought into contact with the stopper, when at least one of two conditions is satisfied, the two conditions consisting of (a) a condition that the value of the electric current detected by the electric current sensor has become not lower than a stopper-contact-judgment electric-current-value and (b) a condition that an increase of the detected value has been continued for at least a stopper-contact-judgment time.

(22) The brake apparatus according to mode (20) or (21), wherein the engaged portion which is provided in the other of the driven member and the piston is disposed such that, in a state in which the driven member and the piston are in contact with each other, the engaged portion and the engaging portion cooperate with each other to define a clearance therebetween in the axial direction, and wherein the reattempt controlling portion includes:

(a) a no-load forward-movement detecting portion that is configured to detect that there is being established a no-load forward-movement state in which the driven member is moved forwardly relative to the piston without a load being applied to the electric motor while the piston being separated from the stopper, when the value of the electric current detected by the electric current sensor has been reduced to be not higher than a given second value; and (b) a first reattempt controlling portion that is configured to control the electric motor such that the driven member is moved forwardly by a given second stroke distance from a point of time at which the no-load forward-movement state has been detected by the no-load forward-movement detecting portion, and such that the driven member is stopped after having been moved forwardly by the given second stroke distance.

When the piston is returned from the stopper, the piston is moved forwardly integrally with the driven member. In this instance, a large load is applied to the electric motor. Then, after having been separated from the stopper, when the driven member is moved forwardly relative to the piston without a load being applied to the electric motor, the load applied to the electric motor is made small.

In view of this fact, it is possible to detect that the piston has been separated from the stopper, when the electric current value has been reduced to the given second value or less.

Then, the driven member is stopped when the driven member has been moved forwardly by the given second stroke distance from the point of time at which the piston has been separated from the stopper. This given second stroke distance may be a distance between a position in which the piston has been actually separated from the stopper and a position in which the driven member should be stopped. The given second stroke distance may be set to zero, too.

It is noted that it is also possible to detect that the piston has been separated from the stopper, when the rate of reduction of the electric current value is abruptly reduced. In this arrangement, the forward movement of the driven member in the no-load state can be detected at an earlier stage.

Further, the given second value may be a value that is determined based on the given first value. For example, the given second value may be a value equal to the given first value or a value close to the given first value (i.e., value within a given range that is determined based on the given first value).

(23) The brake apparatus according to any one of modes (20)-(22), wherein the engaged portion which is provided in the other of the driven member and the piston is disposed such that, in a state in which the driven member and the piston are in contact with each other, the engaged portion and the engaging portion cooperate with each other to define a clearance therebetween in the axial direction, and wherein the reattempt controlling portion includes: (a) a forward-contact detecting portion configured to detect that the driven member has been brought into contact with the piston as a result of forward movement of the driven member, when the value of the electric current detected by the electric current sensor has been increased by at least a given second width; and (b) a second reattempt controlling portion configured to control the electric motor such that the driven member is stopped at a point of time at which the contact of the driven member with the piston is detected by the forward-contact detecting portion.

The driven member is brought into contact with the piston in the forward direction, as a result of the forward movement of the driven member relative to the piston within the clearance after the separation of the piston from the stopper. Upon contact of the driven member with the piston, the electric current flowing through the electric motor is increased. In view of this fact, it is possible to detect that the driven member has been brought into contact with the piston, when the electric current has been increased by at least the given second width that may be a value determined based on a width of increase of the load applied to the electric motor (i.e., a width of increase of the electric current flowing through the electric motor) as a result of the contact of the driven member with the piston.

In the brake apparatus recited in this mode (23), the driven member is stopped in the position in which the driven member is in contact with the piston, so that the driven member is stopped in a more front position than in the brake apparatus recited in the above mode (22).

MODES FOR CARRYING OUT THE INVENTION

There will be described an electric brake apparatus as an embodiment of the present invention, with reference to drawings.

Embodiment 1

Figure 1:
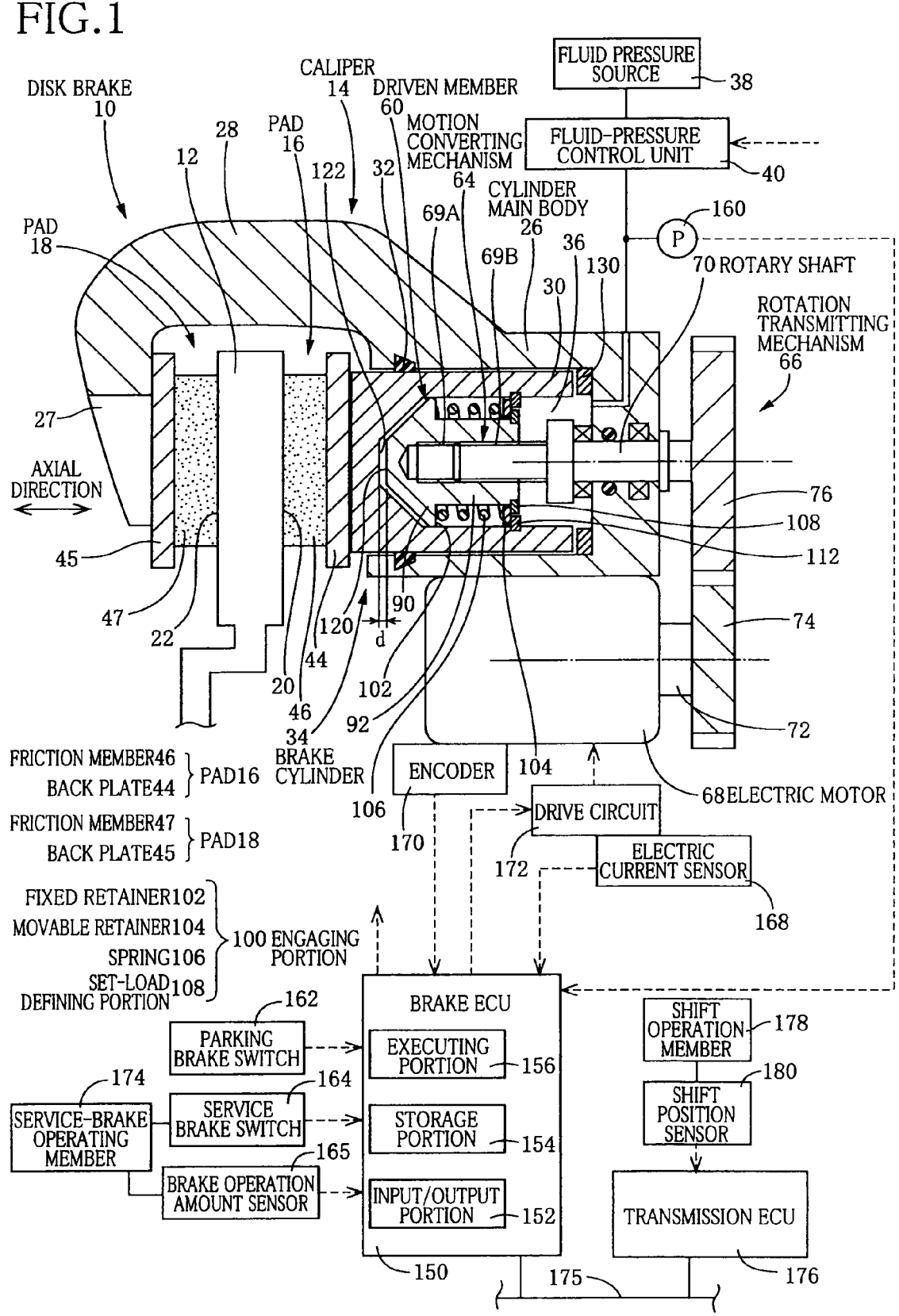
FIG. 1 is a view (partially cross sectional view) showing a brake apparatus that is common to a plurality of embodiments of the present invention.

The electric brake apparatus according to the present embodiment includes a disk brake 10, as shown in FIG. 1. The disk brake 10 is activated to serve as a service brake and also as a parking brake.

Reference sign 12 denotes a disk rotor which is to be rotated together with a wheel, while reference sign 14 denotes caliper (i.e., float caliper in the present invention) which is supported by a non-rotatable member (not shown) such that the supported caliper 14 is movable relative to the non-rotatable member in directions parallel to an axis of the wheel. A pair of pads 16, 18 as friction elements are held by the non-rotatable member such that the pads 16, 18 are moveable toward and away from respective friction surfaces 20, 22 of the disk rotor 12. The caliper 14 includes a cylinder main body 26, a reaction portion 27 and a connecting portion 28 that interconnects between the cylinder main body 26 and the reaction portion 27, and is supported by the non-rotatable member such that the supported caliper 14 straddles over the disk rotor 12 and pair of pads 16, 18.

The cylinder main body 26 has a cylinder bore formed therein, and a piston 30 as a pressing member is fluid-tightly and axially slidably fitted in the cylinder bore of the cylinder main body 26. Further, a ring-like-shaped piston seal 32 is disposed between the cylinder bore and the piston 30. The cylinder main body 26 and the piston 30 cooperate with each other to constitute at least a part of a brake cylinder 34, and has a fluid pressure chamber 36 constituted by a portion of the cylinder bore which is located on a rear side of the piston 30.

A fluid pressure source 38 is connected to the fluid pressure chamber 36 via a fluid-pressure control unit 40. The fluid pressure source 38 may include a master cylinder that is to be caused, by a brake operation carried out by a vehicle operator, to generate a fluid pressure and/or a power fluid pressure source such as a pump device that is to be caused, by supply of power thereto, to generate a fluid pressure. The fluid-pressure control unit 40 may include at least one electromagnetic valve, and is controlled such that a fluid pressure in the fluid pressure chamber 36 becomes close to a required fluid pressure.

The pads 16, 18 include respective back plates 44, 45 and respective friction members 46, 47 as elastic members that are fixed to the respective back plates 44, 45. The disk brake 10 is activated by causing the friction members 46, 47 to be pressed against the disk rotor 12, namely, by frictional engagement of each of the friction members 46, 47 with the disk rotor 12. Each of the pads 16, 18 is pressed against the disk rotor 12 by a pressing force, and a braking force based on the pressing force is applied to the wheel, whereby rotation of the wheel is restrained. Thus, the braking force applicable to the wheel is increased with increase of the pressing force.

In the following description regarding the present embodiment, the pressing force and the braking force are regarded as forces that correspond to each other.

The piston 30 is constituted by a cylindrical-shaped body with a bottom wall, and extends in a direction of an axis of the piston 30. The piston 30 is disposed with its attitude which causes a bottom-wall portion of the piston 30 to be located on a front side of a cylindrical wall portion of the piston 30, namely, which causes the cylindrical wall portion of the piston 30 to be located on a rear side of the bottom-wall portion of the piston 30. A nut member 60 as a driven member is held on an inner peripheral side of the piston 30, such that the nut member 60 is movable relative to the piston 30 and is unrotatable relative to the piston 30. The nut member 60 is connected to an electric motor 68 via a motion converting mechanism 64 and a rotation transmitting mechanism 66, so as to be movable relative to the piston 30 by activation of the electric motor 68.

The motion converting mechanism 64 includes a screw mechanism including an internally threaded portion 69A of the nut member 60 and an externally threaded portion 60B of a rotary shaft (spindle) 70. The internally threaded portion 69A provided in an inner circumferential surface of the nut member 60 and the externally threaded portion 69B provided in an outer circumferential surface of the rotary shaft 70 are held in thread-engagement with each other, so that the nut member 60 is linearly movable by rotation of the rotary shaft 70. The rotary shaft 70 is held by the cylinder main body 26 via a radial bearing and a thrust bearing, such that the rotary shaft 70 is rotatable relative to the cylinder main body 26.

The threaded portions 69A, 69B have shapes which do not causes the electric motor 68 to be rotated even when an axial force is applied to the nut member 60 through the piston 30 in a state where an electric current is not being supplied to the electric motor 68. That is, a lead angle of each of the threaded portions 69A, 69B is made so small that the electric motor 68 is not rotated by a component of the axial force, when the axial force is applied to the nut member 60 through the piston 30 in the state where the electric current is not being supplied to the electric motor 68. In this sense, it can be considered that the motion converting mechanism 64 (screw mechanism) has a function of a locking mechanism.

The electric motor 68 is disposed in parallel with the brake cylinder 34 such that an output shaft 72 of the motor 68 is held in parallel with the axial direction of the brake cylinder 34. The rotation of the output shaft 72 is transmitted to the rotary shaft 70 via the rotation transmitting mechanism 66 which has a pair of gears 74, 76 and which serves as a speed reducer.

The nut member 60 is constituted by a member having a step, so as to include a large diameter portion 90 and a small diameter portion 92. The nut member 60 extends in the axial direction, and is disposed with its attitude that causes the large diameter portion 90 to be located on a front side of the small diameter portion 92 (i.e., the large diameter portion 90 to be close to, the bottom wall portion of the piston 30), namely, causes the small diameter portion 92 to be located on a rear side of the large diameter portion 90. A rotation preventing mechanism is provided between the piston 30 and the large diameter portion 90 of the nut member 60.

The nut member 60 is provided with an engaging portion 100 that includes a fixed retainer 102, a movable retainer 104, a spring 106 and a set-load defining portion 108. The fixed retainer 102 is constituted by an annular-shaped shoulder surface of the nut member 60 which interconnects between the large diameter portion 90 and the small diameter portion 92. A protruding portion is fixedly provided on a portion of the small diameter portion 92 of the nut member 60, which is distant from the fixed retainer 102 in the axial direction and which is located on the rear side of the fixed retainer 102. The protruding portion protrudes radially outwardly from the small diameter portion 92 of the nut member 60, and serves as a set-load defining portion 108. Between the fixed retainer 102 and the set-load defining portion 108, the movable retainer (e.g., washer) 104 that is constituted by a generally annular-shaped plate is disposed and movable in the axial direction relative to the fixed retainer 102 and the set-load defining portion 108. The spring 106 is disposed between the fixed retainer 102 and the movable retainer 104.

The spring 106 is held so as to be given a certain value of set load in a state (hereinafter will be referred to as a static state of the spring 106) in which the movable retainer 104 is in contact with the set-load defining portion 108. The certain value of set load is a designed value that does not cause elastic deformation of the spring 106 when the piston 30 is moved rearwardly together with rearward movement of the nut member 60. That is, the certain value of set load is not smaller than a value of push-back load (i.e., load against piston retraction) that is dependent on a sliding resistance to be generated between the piston 30 and the cylinder main body 26 (i.e., generated between the piston 30 and mainly the piston seal 32).

The spring 106 has a small spring constant so that, when the piston 30 is moved forwardly relative to the nut member 60 by a forward force, the forward force is avoided from being reduced considerably by the spring 106.

It is noted that there is a case where the spring 106 is elastically deformed by a small amount when the piston 30 is being retracted, since the set load could be smaller than the load dependent on the sliding resistance, for example, due to variation of the spring 106.

Further, the set-load defining portion 108 may be constituted by either a an annular-shaped member that is provided continuously on an outer circumferential surface of the small diameter portion 92 of the nut member 60 or at least one member provided partially on the outer circumferential surface of the small diameter portion 92. Still further, the set-load defining portion 108 may be constituted by at least one member that is press-fitted in the nut member 60, a plurality of members (e.g., a plurality of pins or screws) that are screwed in the nut member 60 with use of screw mechanisms, or a member (e.g., C-ring) that is relatively unmovably held by the nut member 60.

In any one of these cases, the set-load defining portion 108 has a mechanism for preventing removal of the movable retainer 104 and spring 106 from the nut member 60.

On the other hand, a radially inwardly protruding portion 112, which serves as an engaged portion, is provided in an intermediate portion of the cylindrical wall portion of the piston 30 such that the protruding portion 112 is located on a rear side of the engaging portion 100 of the nut member 60. The engaged portion 112 has a function for preventing removal of the nut member 60.

The engaged portion 112 has an inside diameter (that is defined by a radially innermost portion of the engaged portion 112) which is larger than an outside diameter of the set-load defining portion 108 (that is defined by a radially outermost portion of the set-load defining portion 108), so that the set-load defining portion 108 and the engaged portion 112 do not interfere with each other during relative movement of the piston 30 and the nut member 60.

The inside diameter of the engaged portion 112 is smaller than an outside diameter of the movable retainer 104 so that the engaged portion 112 can be brought into contact with the movable retainer 104 during relative movement of the piston 30 and the unit member 60.

The spring 106 is elastically deformable when the engaged portion 112 and the movable retainer 104 are brought into contact with each other, whereby relative movement of the piston 30 and the nut member 60 is allowed.

As is apparent from FIG. 1, in a state in which the movable retainer 104 is in contact with the set-load defining portion 108, a clearance d is provided between a front end surface 120 of the nut member 60 and an inside bottom surface 122 of the piston 30 in the axial direction. That is, the nut member 60 is disposed in the piston 30 with the clearance d being defined between the nut member 60 and the piston 30.

Further, a stopper 130 is provided in a rear end portion of the cylinder bore of the cylinder main body 26, so as to define a rearward end position of the piston 30. Although the stopper 130 is constituted by a rigid member in the present embodiment, it may be constituted by an elastic member.

It is noted that the engaged portion 112 may be constituted by either an annular-shaped member that is provided continuously on an inner circumferential surface of the cylindrical wall portion of the piston 30 or at least one member provided on the inner circumferential surface of the cylindrical wall portion of the piston 30. For example, the engaged portion 112 may be constituted by a C-ring that is fitted in a groove provided in the an inner circumferential surface of the cylindrical wall portion of the piston 30, or an annular-shaped member that is press-fitted in the groove. Further, the engaged portion 112 may be constituted by a plurality of pins or screws which are embedded in the inner circumferential surface of the cylindrical wall portion of the piston 30 and which protrude radially inwardly from the inner circumferential surface, or a plurality of screws (without heads) that are screwed in the inner circumferential surface with use of screw mechanisms.

The electric motor 68 and the fluid-pressure control unit 40 are controlled in accordance with commands supplied from a brake ECU 150, which is constituted principally by a computer and which includes an input/output portion 152, a storage portion 154 and an executing portion 156. To the input/output portion 152, there are connected, for example, a fluid pressure sensor 160, a parking brake switch 162, a service brake switch 164, a brake operation amount sensor 165, an electric current sensor 168 and an encoder 170. The fluid pressure sensor 160 is configured to detect a fluid pressure in the fluid pressure chamber 36. The electric current sensor 168 is configured to detect an electric current supplied to the electric motor 68. The encoder 170 is configured to detect an angular position of the electric motor 68. To the input/output portion 152, there are further connected the above-described fluid-pressure control unit 40 and electric motor 68 via a drive circuit 172, for example. The parking brake switch 162 is operable by a vehicle operator, and is operated when the operator commands locking of the parking brake (i.e., commands the parking brake to be activated) and when the operator commands release of the parking brake (i.e., commands the parking brake to be released). The service brake switch 164 is configured to detect whether a service-brake operating member 174 (that is operable by the vehicle operator) is in an operated state or a non-operated state. The brake operation amount sensor 165 is configured to detect an operation stroke (i.e., amount of operation) of the brake operating member 174.

Figure 8:
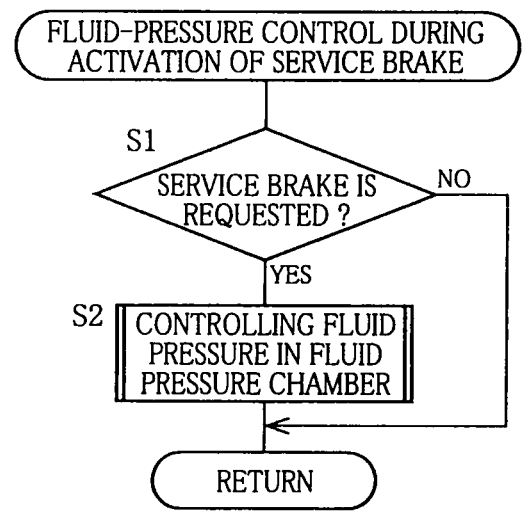
FIG. 8 is a flow chart showing a fluid-pressure control program that is stored in a storage portion of a brake ECU that is included in the brake apparatus.
Figure 9:
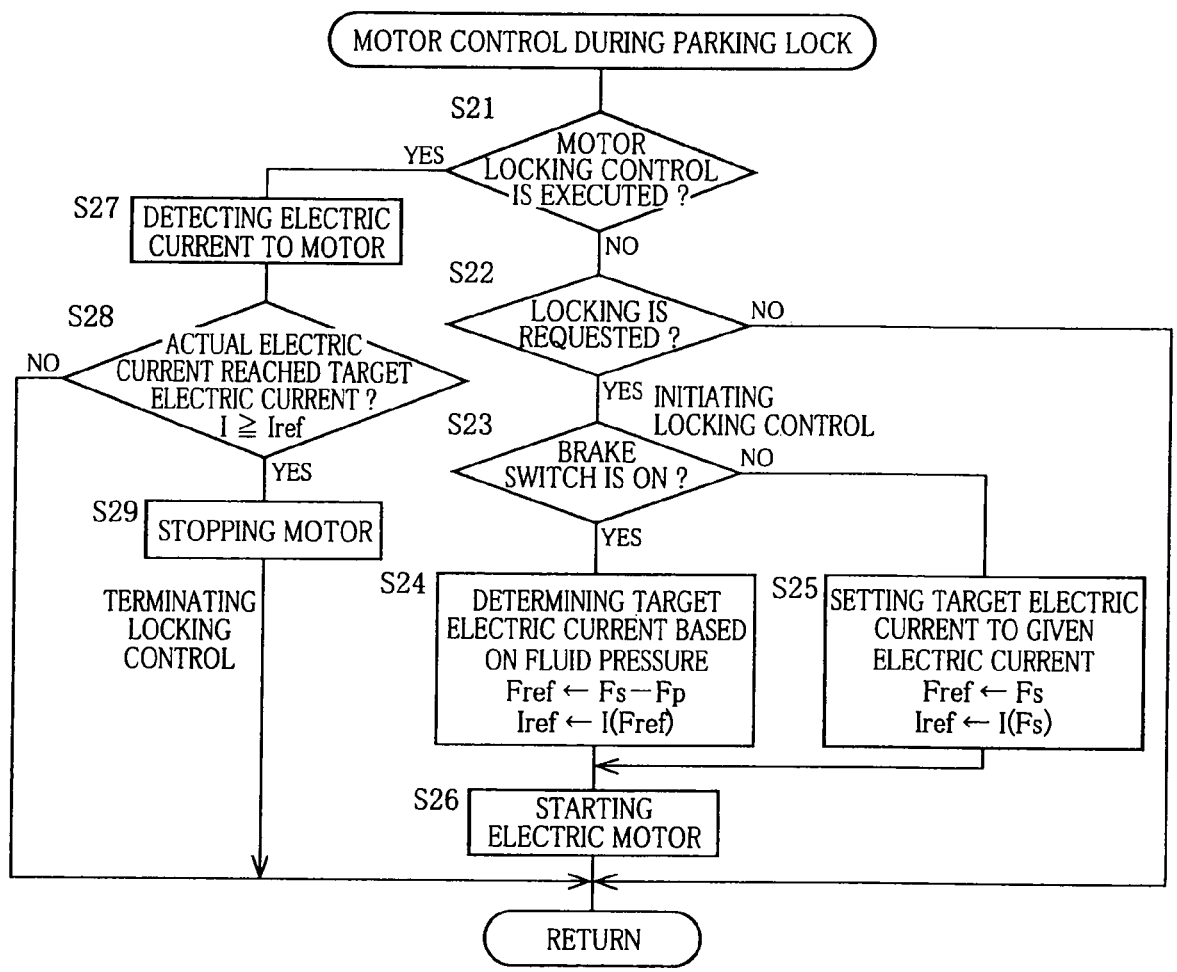
FIG. 9 is a flow chart showing a parking-locked-state motor control program that is stored in the storage portion of the brake ECU.
Figure 10:
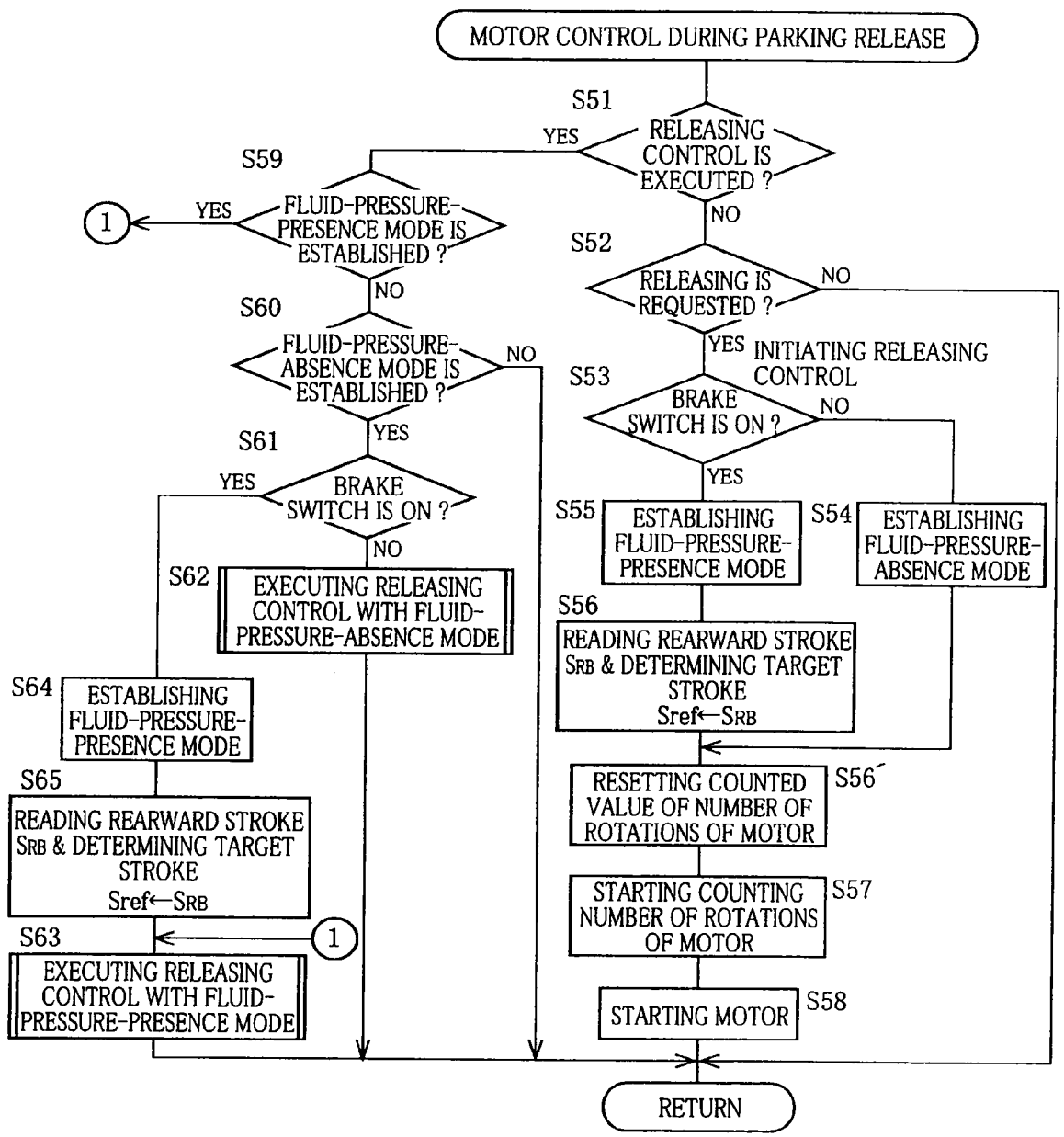
FIG. 10 is a flow chart showing a parking-release-state motor control program that is stored in the storage portion of the brake ECU.

The storage portion 154 stores therein, for example, a fluid-pressure control program shown by a flow chart of FIG. 8 and an electric-motor control program shown by flow charts of FIGS. 9 and 10.

To the brake ECU 150, there is connected a transmission ECU 176 via CAN (car area network) 175. To the transmission ECU 176 that is constituted principally by a computer, there is connected a shift position sensor 180 that is configured to detect a position of a shift operation member 178.

There will be described activation of the electric brake apparatus constructed as described above. In the electric brake apparatus described in the present embodiment, the disk brake 10 is activated as the service brake when the piston 30 is activated by a fluid pressure in the brake cylinder 34, and is activated as the parking brake when the piston 30 is activated by a driving force applied from the nut member 60 (i.e., driving force of the electric motor 68).

1. Non-Activated State of Disk Brake

Figure 2:
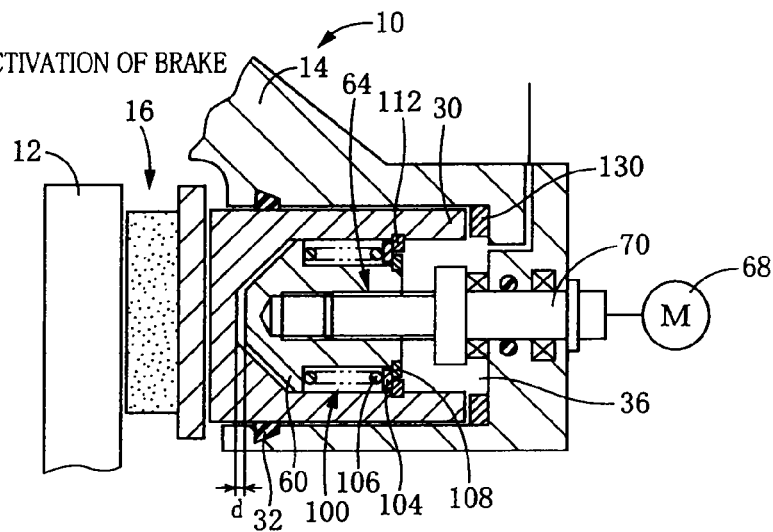
FIG. 2 is a view of a disk brake included in the brake apparatus, showing an operational state (non-activated state) of the disk brake.

As shown in FIG. 2, during the non-activated state of the disk brake 10, the nut member 60 and the piston 30 are positioned in their respective zero point positions.

In the nut member 60, the spring 106 is in the static state (in which the movable retainer 104 is in contact with the set-load defining portion 108). When the fluid pressure is supplied into the fluid pressure chamber 36, the piston 30 can be rapidly moved in the forward direction by compression of the spring 106.

While the nut member 60 and the piston 30 are positioned in their respective zero point positions, the pads 16, 18 (see FIG. 1) are separated from the disk rotor 12 so that dragging of each of the pads 16, 18 on the disk rotor 12 is not caused. Further, delay in the response of the brake is small.

The zero point positions will be described below in detail. In the following descriptions, the zero point position will be referred to mean the zero point position of the nut member 60 in some cases and will be referred to mean the zero point position of the piston 30 in other cases.

2. Activation of Service Brake

Figure 3:
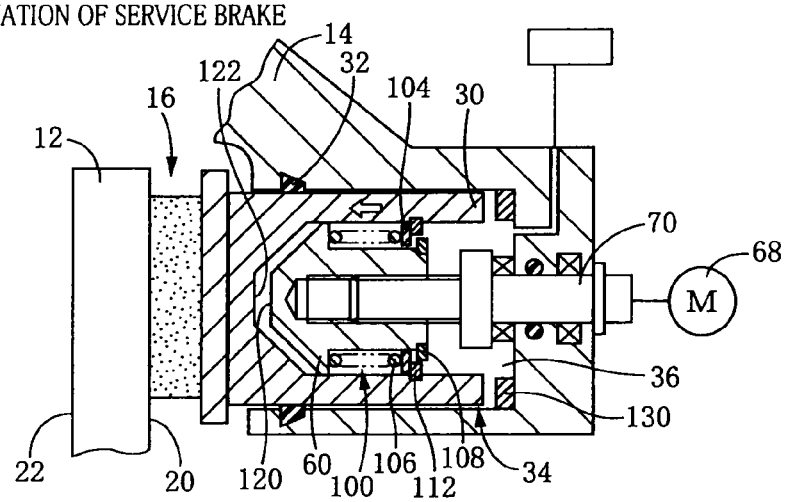
FIG. 3 is a view of the disk brake, showing another operational state (in which a service brake is in its activated state) of the disk brake.

When the service-brake operating member 174 (see FIG. 1) is operated (so as to cause the brake to be activated), the fluid pressure is supplied to the fluid pressure chamber 36 of the brake cylinder 34 whereby the piston 30 is moved in the forward direction as shown in FIG. 3. Since the electric motor 68 is in its stop state, the nut member 60 is held in its zero point position. The spring 106 is elastically deformed (compressed) whereby the piston 30 is allowed to be moved in the forward direction relative to the nut member 60.

In the present embodiment, the spring 106 and other elements are designed such that, even when the nut member 60 is positioned in its zero point position or in its rearward end position, the piston 30 can be moved forwardly to its forward end position (i.e., the spring 106 can be elastically deformed).

The pad 16 is pressed against the disk rotor 12 by the forward movement of the piston 30. The caliper 14 is relatively moved in the rearward direction, so that the reaction portion 27 (see FIG. 1) causes the pad 18 to be pressed against the disk rotor 12. Thus, the pair of pads 16, 18 are pressed against the friction surfaces 20, 22 of the disk rotor 12. Further, the caliper 14 is elastically deformed, and the pads 16, 18 are elastically deformed. The piston seal 32 is elastically deformed by the fluid pressure in the fluid pressure chamber 36 and a friction force generated between the piston seal 32 and the piston 30.

When the fluid pressure in the fluid pressure chamber 36 is reduced by a releasing operation of the service-brake operating member 174 (i.e., operation for releasing the brake), the amount of elastic deformation of the caliper 14 is reduced and the amount of elastic deformation of each of the pads 16, 18 is reduced, so that the caliper 14 is allowed to be moved in the forward direction. The piston 30 is allowed to be moved in the rearward direction. The piston 30 is moved in the rearward direction by restoring forces generated by the pads 16, 18, caliper 14 and piston seal 32, which have been elastically deformed. When the fluid pressure in the fluid pressure chamber 36 is reduced to an atmospheric pressure, the piston 30 is moved rearwardly to its zero point position indicated in FIG. 2. During activation of the service brake, since the nut member 60 is held in its zero point position, the position of the piston 30 is dependent on the nut member 60 (spring 106).

Even if the piston 30 is impeded, by some reasons, from being moved back to its zero point position by the restoring forces of elastic deformations of the pads 16, 18, caliper 14 and piston seal 32 (hereinafter simply referred to as "restoring forces of the pads and other elastic members"), the piston 30 can be moved back to its zero point position as indicated by FIG. 2, owing to the elastic force of the spring 106, because the spring 106 is in its compressed state even if the piston 30 is not returned to its zero point position. Consequently, it is possible to satisfactorily prevent dragging of each of the pads 16, 18 on the disk rotor 12.

The fluid pressure in the fluid pressure chamber 36 is controlled by execution of the fluid-pressure control program shown by the flow chart of FIG. 8. The fluid-pressure control program is executed repeatedly at a predetermined time interval.

The fluid-pressure control program is initiated with step S1 that is implemented to judge whether or not the service brake is requested to be activated. For example, when the service-brake operating member 174 is being operated, it is judged that the activation of the service brake is requested, and step S2 is implemented to control the fluid pressure in the fluid pressure chamber 36 of the brake cylinder 34. In this step S2, a target value of the fluid pressure is determined based on the operation stroke distance of the service-brake operating member 174, which is detected by the brake operation amount sensor 165, and the fluid-pressure control unit 40 is controlled such that a detected value of the fluid pressure detected by the fluid pressure sensor 160 becomes close to the target value of the fluid pressure. The piston 30 is moved forwardly by the fluid pressure in the fluid pressure chamber 36, so as to cause the pads 16, 18 to be pressed against the disk rotor 12. In this instance, a value of the pressing force (by which the pads 16, 18 is pressed against the disk rotor 12) is dependent on the fluid pressure in the brake cylinder 34.

In the present embodiment, the above-described another drive device includes the fluid pressure source 38 and the fluid-pressure control unit 40. However, the fluid-pressure control unit 40 is not essential. That is, in an arrangement in which the fluid pressure source includes the master cylinder, the fluid pressure of the master cylinder may be supplied directly to the fluid pressure chamber 36.

3. Locking of Parking Brake

Figure 4:
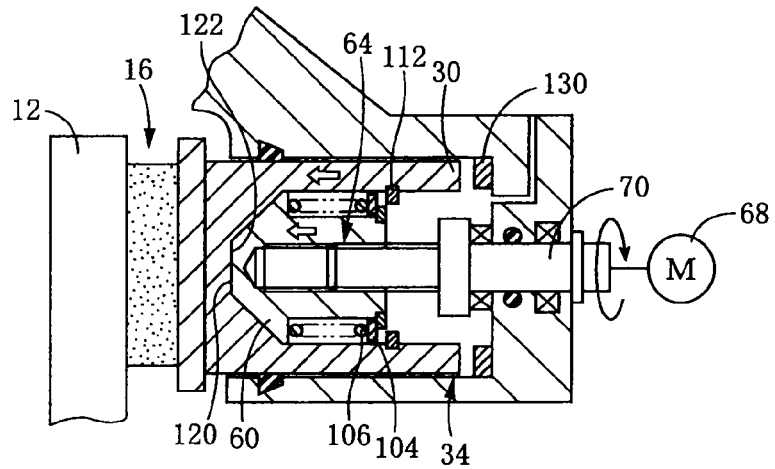
FIG. 4 is a view of the disk brake, showing still another operational state (in which a parking brake is in its locking state) of the disk brake.

When the parking brake is required to be activated, for example, in case of locking operation of the parking brake switch 162, the electric motor 68 is rotated for causing the nut member 60 to be moved forwardly, as shown in FIG. 4.

The nut member 60 is moved forwardly relative to the piston 30 whereby the front end surface 120 of the nut member 60 is caused to be brought into contact with the inside bottom surface 122 of the piston 30. After the nut member 60 has been brought into contact with the piston 30, the piston 30 and the nut member 60 are moved in the forward direction together with each other, by activation of the electric motor 68. The electric motor 68 is stopped when a detected value of the electric current detected by the electric current sensor 168 (see FIG. 1) reaches a target value of the electric current.

When the parking brake is operated to be locked, there are a case where the service brake is in its activated state and also a case where the service brake is in its non-activated state.

In the case where the service brake is in its activated state, a total brake force that corresponds to a sum of the service brake force and the parking brake force, is applied to the wheel. That is, the fluid pressure in the brake cylinder 34 is applied to the piston 30 and the driving force of the electric motor 68 is applied to the piston 30 via the nut member 60. Thus, both of the fluid pressure and the driving force are applied to the piston 30. The pads 16, 18 are pressed against the disk rotor 12 by a sum of a pressing force based on the fluid pressure in the brake cylinder 34 and a pressing force based on the driving force of the electric motor 68, whereby both of the service brake force based on the fluid pressure and the parking braking force based on the electric motor 68 can be applied to the wheel. Further, since the motion converting mechanism 64 has a locking mechanism, the total brake force corresponding to the sum of the service brake force and the parking brake force and applied to the wheel is maintained, even if the fluid pressure in the brake cylinder 34 is reduced back to the atmospheric pressure while the supply of the electric current to the electric motor 68 is stopped.

On the other hand, while the vehicle is being in its stop state, a value of the braking force that is to be applied to the wheel is not particularly limited, as long as the value of the applied braking force is sufficient for maintaining the stop state of the vehicle.

In view of this, in the present embodiment, the parking brake force is controlled such that a given value (predetermined fixed value) $F_S$ of the parking brake force (total brake force), which enables the vehicle to be held in the stop state, can be applied to the wheel during locking of the parking brake, irrespective of whether the service brake is in its activated state or non-activated state.

When the service-brake operating member 174 is not in its operated state, a required value Fref of the parking brake force is set to the given value $F_S$ of the parking brake force, and a target value $I_{ref}$ of the electric current is set to a given (predetermined) value $I_S$ of the electric current. The given value $I_S$ of the electric current is a value required for outputting the given value $F_S$ of the parking brake force.

$$F_{ref}=F_S$$

$$I_{ref}=I(F_{ref})=I_S$$

When the service-brake operating member 174 is in its operated state, the fluid pressure P in the brake cylinder 34 is detected by the fluid pressure sensor 168, and the required value $F_{ref}$ of the parking brake force is set to a value that is obtained by subtracting the service brake force $F_P$ (based on the fluid pressure P) from the given value $F_S$ of the parking brake force. Further, the target value $I_{ref}$ of the electric current is set to a value required for outputting the required value $F_{ref}$ of the parking brake force.

$$F_{ref}=F_S-F_P$$

$$I_{ref}=I(F_{ref})$$

FIG. 9 is a flow chart showing a parking-locked-state motor control program, which is executed repeatedly at a predetermined time interval.

This motor control program is initiated with step S21 that is implemented to judge whether the electric motor 68 is being subjected to a locking control. When the motor 68 is not being subjected to the locking control, the control flow goes to step S22 that is implemented to judge whether the locking of the parking brake is requested or not. While the locking is not being requested, steps S21 and S22 are repeatedly implemented.

When the locking request is detected as a result of locking operation of the parking brake switch 162, a motor locking control is initiated, so that a locking control flag is set whereby the target value $I_{ref}$ of the electric current is determined and the electric motor 68 is started.

Specifically, in step S23, it is judged whether the service brake switch 164 is in its ON state or not, i.e., whether the service-brake operating member 174 is in its operated state or not. When the service-brake operating member 174 is not being operated (i.e., when the service brake switch 164 is in its OFF state), the target value $I_{ref}$ of the electric current is set to the given value $I_S$ of the electric current. When the service-brake operating member 174 is being operated (i.e., when the service brake switch 164 is in its ON state), the required value $F_{ref}$ of the parking brake force is determined based on the fluid pressure P in the brake cylinder 34, and then the target value $I_{ref}$ of the electric current is determined such that the determined target value $I_{ref}$ corresponds to a value that makes it possible to obtain the required value $F_{ref}$ of the parking brake force $\{I_{ref}=I(F_{ref})\}$.

Thus, the target value $I_{ref}$ of the electric current is set to a value making it possible to obtain the given value $F_S$ of the total brake force, irrespective of whether the service-brake operating member 174 is being operated or not. The target value $I_{ref}$ of the electric current is set to a smaller value when the fluid pressure P is high, than when the fluid pressure P is low.

It is noted, in step S22, it may be judged that the request for the locking of the parking brake is detected, when the shift operation member 178 is operated in accordance with a predetermined pattern such as an operation of switching from its driving position to its parking position, even without operation of the parking brake switch 162.

Further, in step S23, the judgment as to whether the service-brake operating member 174 is in its operated state or not does not necessarily have to be made by judging whether the service brake switch 164 is in its ON state or not, but may be made by judging whether or not a detected value P of the fluid pressure detected by the fluid pressure sensor 160 is higher than a given value $P_{th}$ of the fluid pressure (P>$P_{th}$). That is, when the detected value P is higher than the given value $P_{th}$ of the fluid pressure, it can be judged that the service-brake operating member 174 is being operated. The given value $P_{th}$ of the fluid pressure is set to a value that makes it possible to regard that the service brake is being activated.

On the other hand, when the locking control is being executed, (for example, when the locking flag is being set,) a positive judgment (YES) is obtained in step S21. In step S27, the detected value I of the electric current detected by the electric current sensor 168 is read. In step S28, it is judged whether or not the actual value I of the electric current has reached the target value $I_{ref}$ of the electric current. Steps S21, S27, S28 are repeatedly implemented before the actual value I of the electric current reaches the target value $I_{ref}$ of the electric current. When the actual value I of the electric current has reached the target value $I_{ref}$ of the electric current, a positive judgment (YES) is obtained in step S28, and the electric motor 68 is stopped in step S29, whereby the locking control is terminated. The locking control flag is reset. The pads 16, 18 are pressed against the disk rotor 12 by a pressing force that makes it possible to output the required value $F_{ref}$ of the parking brake force.

Figure 14:
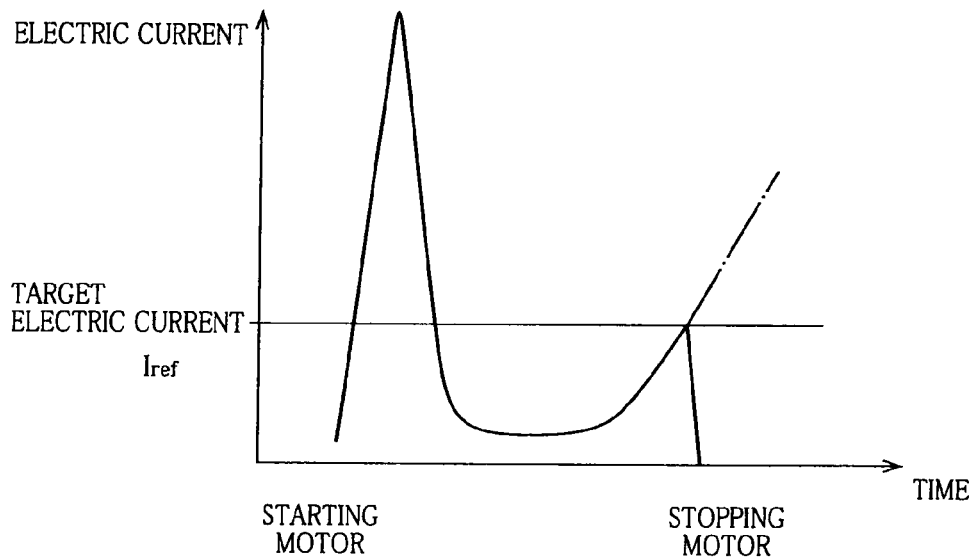
FIG. 14 is a view showing change of an electric current flowing through an electric motor included in the brake apparatus, when the parking brake is operated to be locked.

As shown in FIG. 14, a large starting current (rush current) is caused to flow upon start of the electric motor 68, and thereafter the electric current is reduced as the electric motor 68 is rotated, such that the electric current is reduced to an amount that is dependent on the load applied to the motor 68 via the piston 30 and the nut member 60. Then, the load is increased with increase of a reaction force applied to the nut member 60, whereby the electric current is increased. When the value of the electric current detected by the electric current sensor 168 has reached the target value $I_{ref}$ of the electric current, the electric motor 68 is stopped.

4. Release of Parking Brake

When the parking brake switch 162 is operated to release the parking brake, the electric motor 68 is rotated in a reverse direction opposite to a direction in which the motor 68 is rotated for locking the parking brake, whereby the nut member 60 is moved in the rearward direction.

On the other hand, when the parking brake is operated to be locked during the non-activated state of the service brake, the piston 30 is moved forwardly as the nut member 60 is moved forwardly. In this instance, however, since the fluid pressure is not generated in the fluid pressure chamber 36, the piston seal 32 is not substantially elastically deformed. Therefore, the piston 30 cannot be returned sufficiently upon release of the disk brake 10, so that a brake dragging is likely to be caused.

When the parking brake is operated to be locked during the activated state of the service brake, the piston 30 is further moved forwardly as the nut member 60 is moved forwardly, from its state in which the piston 30 has been already moved forwardly by the fluid pressure. In this instance, an amount of the elastic deformation of the piston seal 32 is insufficient for the forward movement of the piston 30. Therefore, the piston 30 cannot be returned sufficiently upon release of the disk brake 10, so that a brake dragging is likely to be caused.

In view of these problems, the piston 30 is returned to its zero point position by the nut member 60 in the present embodiment.

When the parking brake is operated to be released, there are a case where the service brake is in its activated state and also a case where the service brake is in its non-activated state. Further, during release of the parking brake, there is a case where the service-brake operating member 174 is operated.

When the service brake is in its non-activated state, the release of the parking brake is controlled with a fluid-pressure-absence mode such that the nut member 60 is returned to its zero point position.

When the service brake is in its activated state, or when the service-brake operating member 174 is operated during release of the parking brake, the release of the parking brake is controlled with a fluid-pressure-presence mode (the control mode is switched to the fluid-pressure-presence mode). In the releasing control with the fluid-pressure-presence mode, the nut member 60 is moved rearwardly from its locking position by a target stroke distance $S_{ref}$. The target stroke distance $S_{ref}$ is a value stored in the storage portion 154, and is an actual stroke distance (rearward stroke distance) $S_{RB}$ corresponding to a distance by which the nut member 60 has been moved rearwardly from its locking position to its actual zero portion in a previous execution of the releasing control with the fluid-pressure-absence mode. In other words, the rearward stroke distance $S_{RB}$ is an actual movement amount (rearward stroke distance) by which the nut member 60 is actually moved in a period from a point of time at which the electric motor 68 has been started to a point of time at which the electric motor 68 is stopped, in execution of the releasing control with the fluid-pressure-absence mode. Each time when the releasing control is terminated with stop of the electric motor 68, the actual rearward stroke distance $S_{RB}$ is stored as an updated rearward stroke distance $S_{RB}$. Thereafter, when the releasing control is to be executed with the fluid-pressure-presence mode, the updated rearward stroke distance $S_{RB}$ is read as the target stroke distance $S_{ref}$.

$$S_{ref}=S_{RB}$$

Figure 15:
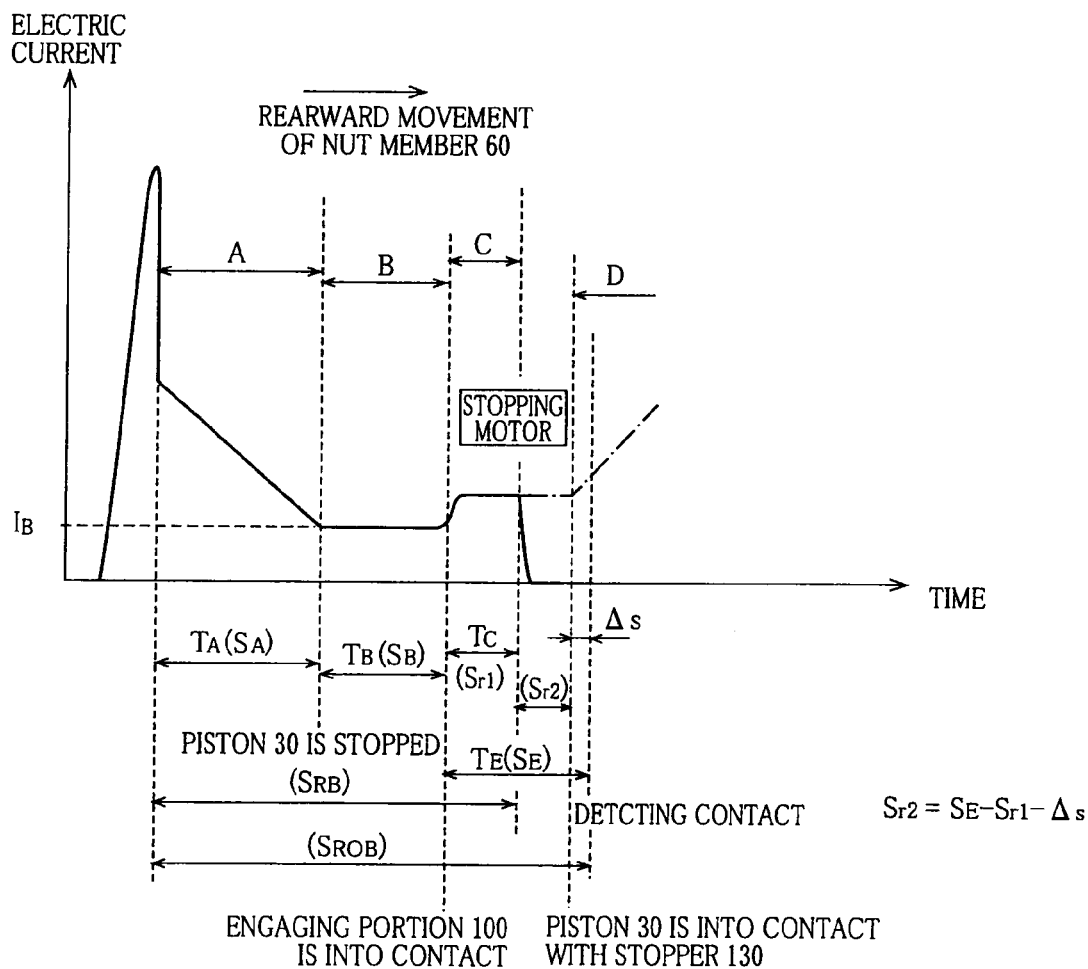
FIG. 15 is a view showing change of the electric current flowing through the electric motor, when the parking brake is operated to be released in the normal mode.

It is noted that, in FIG. 15, the rearward stroke distance $S_{RB}$ is represented by a stroke distance in a period from a point of time at which the starting current has been converged to a point of time at which the electric motor 68 is stopped. This is because it is considered that the electric motor 68 is not substantially rotated in a period in which the starting current flows. However, in FIG. 15, the rearward stroke distance $S_{RB}$ may be represented by also a stroke distance in a period from a point of time at which the electric motor 68 is started to the point of time at which the electric motor 68 is stopped.

FIG. 10 is a flow chart showing a parking-release-state motor control program, which is executed repeatedly at a predetermined time interval.

This motor control program is initiated with step S51 that is implemented to judge whether the electric motor 68 is being subjected to a releasing control. When the motor 68 is not being subjected to the releasing control, the control flow goes to step S52 that is implemented to judge whether the releasing of the parking brake is requested or not. While the releasing is not being requested, steps S51 and S52 are repeatedly implemented.

When the releasing request is detected, the releasing control is started for the electric motor 68. In this instance, for example, a releasing control flag is set.

In step S53, it is judged whether the service brake switch 164 is in its ON state or not. When the service brake switch 164 is in its OFF state, step S54 is implemented to establish the fluid-pressure-absence mode. When the service brake switch 164 is in its ON state, step S55 is implemented to establish the fluid-pressure-presence mode. Step S55 is followed by step S56 in which the rearward stroke distance $S_{RB}$ is read out from the storage portion 154 and then the target stroke distance $S_{ref}$ is set to the rearward stroke distance $S_{RB}$ ($S_{ref}=S_{RB}$). In either of the case of establishment of the fluid-pressure-absence mode and the case of establishment of the fluid-pressure-presence mode, step S56' is implemented to reset a counted value of number of rotations of the motor 68, and then step S57 is implemented to start counting the number of rotations of the motor 68, based on a value detected by the encoder 170. Step S57 is followed by step S58 in which the electric motor 68 is started.

In the present embodiment, the stroke distance of the nut member 60 is obtained based on the number of rotations of the electric motor 68. Further, it is possible to obtain a length of time of activation of the motor 68, based on the number of rotations of the motor 68 and a rotational velocity of the motor 68.

It is noted that the number of rotations of the motor 68 and the stroke distance of the nut member 60 correspond to each other so that either one of the number of rotations and the stroke distance can be used in place of the other. Further, as described later, in regions B and C in which the rotational velocity of the motor 68 is constant, the length of time of the activation, the number of rotations and the stroke distance correspond to one another, so that any one of the length of time of the activation, the number of rotations and the stroke distance can be used in place of the other.

On the other hand, when the motor 68 is being subjected to the releasing control, (for example, when the releasing control flag is set,) step S59 is implemented to judge whether the fluid-pressure-presence mode is being established or not, and step S60 is implemented to judge whether the fluid-pressure-absence mode is being established or not. When the fluid-pressure-absence mode is being established, the control flow goes to step S61 in which it is judged whether or not the service brake switch 164 has been switched from its OFF state to its ON state. When the service brake switch 164 remains in its OFF state, step S62 is implemented to execute the releasing control with the fluid-pressure-absence mode.

On the other hand, when the fluid-pressure-presence mode is being established, a positive judgment (YES) is obtained in step S59, so that the control flow goes to step S63 in which the releasing control is executed with the fluid-pressure-presence mode. Further, when the service brake switch 164 is switched from its OFF state to its ON state during the releasing control (i.e., when the service-brake operating member 174 is depressed during the releasing control), step S64 is implemented to establish the fluid-pressure-presence mode and step S65 is implemented to set the target stroke distance $S_{ref}$ to the rearward stroke distance $S_{RB}$ ($S_{ref}=S_{RB}$). Further, step S63 is implemented to execute the releasing control with the fluid-pressure-presence mode.

Thus, when the service-brake operating member 174 is operated in the process of releasing of the parking brake, the releasing control is executed with the fluid-pressure-presence mode, so as to cause the nut member 60 to be moved rearwardly. In this instance, the piston 30 is movable forwardly owing to the compression of the spring 106 and the fluid pressure in the brake cylinder 34.

It is noted that, when the service brake switch 164 is switched from its ON state to its OFF state in the process of releasing of the parking brake, it is possible to cause the releasing control to be executed with the fluid-pressure-absence mode.

Further, it may be judged that the releasing of the parking brake is requested, when the shift operation member 178 is operated to be switched from its parking position to its driving position.

Further, implementation of step S60 is not essential since this step S60 is implemented merely for confirmation purpose.

4-1 Releasing Control with Fluid-Pressure-Absence Mode

There will be described a case where the releasing control is executed with the fluid-pressure-absence mode in step S62.

Figure 5:
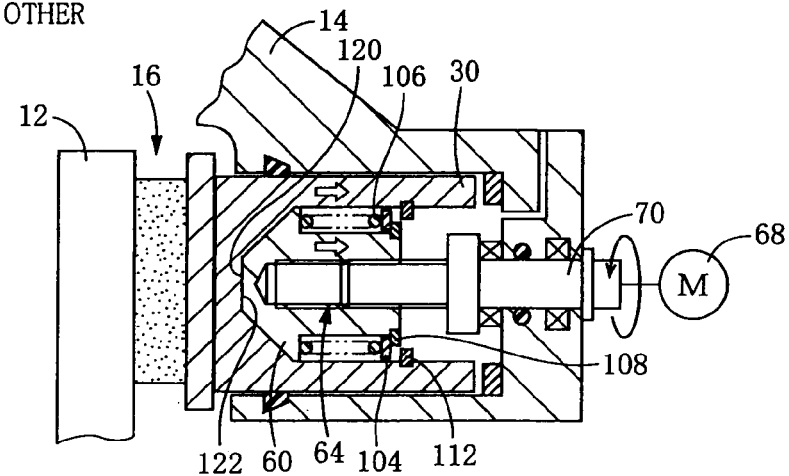
FIG. 5 is a set of views of the disk brake, showing other operational states (in which the parking brake is being released in a normal mode) of the disk brake.
Figure 5:
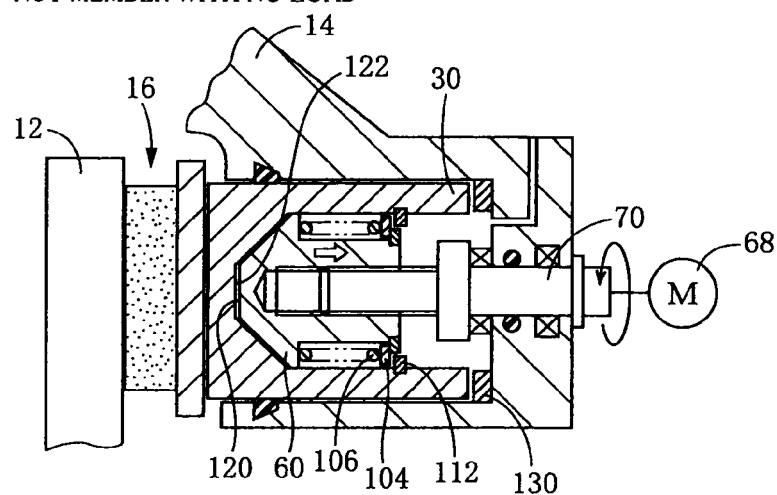
Figure 5:
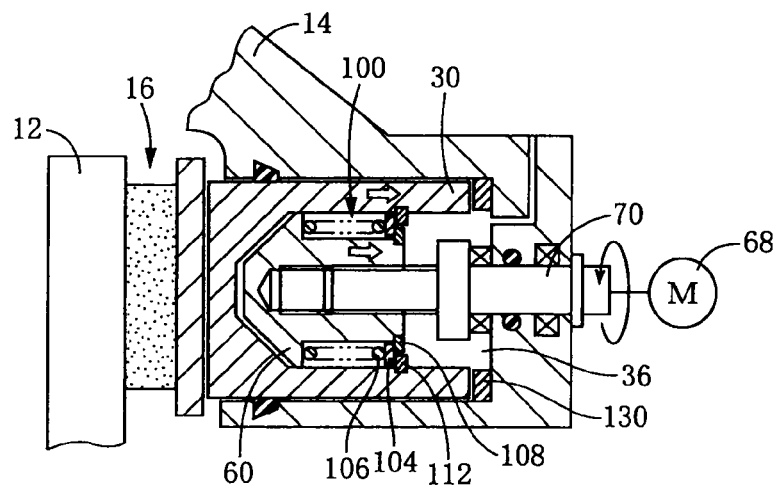

(a) State in which the Piston 30 is Moved Rearwardly by the Restoring Force by the Elastic Members Such as the Pads As shown in FIG. 5 (*a*), the nut member 60 is moved rearwardly by rotation of the electric motor 68 in the above-described reverse direction, and the piston 30 is moved rearwardly by the restoring forces generated by the elastic members such as the pads, so that the piston 30 and the nut member 60 are moved rearwardly together with each other (with the front end surface 120 of the nut member 60 and the inside bottom surface 122 of the piston 30 being in contact with each other).

Since the motion converting mechanism 64 has the locking function, as described above, the electric motor 68 is caused to receive a load by the force applied from the piston 30 to the nut member 60.

Meanwhile, the amount of elastic deformation of each of the pads 16, 18 (see FIG. 1) and caliper 14 is reduced by the rearward movement of the piston 30. The reduction of the elastic deformation of each of the pads 16, 18 and caliper 14 causes a reduction of the force applied from the pads 16, 18 to the piston 30 and also a reduction of the load applied to the electric motor 68.

Thus, when the piston 30 and the nut member 60 are moved in the rearward direction integrally with each other, the electric current flowing to the electric motor 68 is temporarily reduced in the region A indicated in FIG. 15 in which a horizontal axis represents a time.

It is noted that the time, which is represented by the horizontal axis, is not necessarily proportional to the stroke distance since the rotational velocity of the electric motor 68 is not constant. In FIG. 15, the stroke distance S conceptually indicates the stroke distance of the nut member 60 in each of the regions. In FIG. 15, as well as in FIG. 16, a large length of the time does not necessarily mean a large length of the stroke.

(b) State in which the Nut Member 60 is Rearwardly Moved with No Substantial Load As shown in FIG. 5 (*b*), the piston 30 is moved rearwardly by the restoring force of the elastic member such as each of the pads, and is then stopped. On the other hand, the nut member 60 continues to be moved rearwardly, so as to be moved rearwardly within a clearance (that is defined between the piston 30 and the nut member 60), relative to the piston 30. The front end surface 120 of the nut member 60 is separated from the inside bottom surface 122 of the piston 30, while the engaged portion 112 of the piston 30 is being separated from the movable retainer 104 of the spring 106. In this instance, since the load applied to the electric motor 68 is made extremely small, it can be regarded that the applied load is substantially zero. (In the following description as to the present embodiment, the state in which the load applied to the motor 68 is extremely small will be simply referred to as a no-load state.) Therefore, the electric current flowing through the motor 68 is extremely small, and this state continues while the nut member 60 is being moved rearwardly within the clearance. This state corresponds to the region B indicted in FIG. 15. The stroke distance $S_B$, corresponding to the time $T_B$, corresponds to the above-described clearance d.

Meanwhile, a rate of reduction of the electric current is abruptly reduced upon transition from the region A to the region B, as shown in FIG. 15. Then, as described above, the electric current flowing through the electric motor 68 is extremely small in the region B, and this state continues for the time $T_B$.

In view of this fact, in the present embodiment, when the electric current value detected by the electric current sensor 168 is kept to be not higher than a given first value $I_{r1}$ for at least a given first time $T_{r1}$, it is determined that the non-load state is being established. The given first value $I_{r1}$ is an electric current value that makes it possible to regard that the electric motor 68 is substantially in the no-load state. The given first time $T_{r1}$ is a length of time that is determined based on, for example, the clearance d and the rotational velocity of the electric motor 68. For example, the given first time $T_{r1}$ may be a length of time ($T_B/3$) that is required for the nut member 60 to be moved by about ⅓ of the clearance d. Further, an average electric current value during the no-load state is stored as the no-load-state electric current $I_B$.

It is noted that the determination as to whether the electric motor 68 is in the no-load state can be made also based on, for example, the rate of change of the electric current and the amount of change of the electric current.

Further, a lowest electric current value during the no-load state, in place of the average electric current value, may be stored as the no-load-state electric current $I_B$.

In the no-load state, since the rotational velocity of the electric motor 68 is constant, the activation time and the stroke distance are proportional to each other during the region B.

(c) State in which the Piston 30 is Pulled by the Nut Member 60

As a result of rearward movement of the nut member 60 within the clearance, the engaging portion 100 is brought into contact with the engaged portion 112 of the piston 30. Thereafter, the piston 30 is moved rearwardly with the rearward movement of the nut member 60, as shown in FIG. 5 (c). In this instance, the set load of the spring 106 is made larger than the push-back load applied to the piston 30, so that elastic deformation of the spring 106 is not caused by the rearward movement of the piston 30. The nut member 60 is stopped in its zero point position shown in FIG. 2, i.e., in a position to which the nut member 60 has been moved rearwardly by a given first stroke distance $S_{r1}$ from its engagement with the piston 30. Upon contact of the nut member 60 with the piston 30, the load applied to the electric motor 68 is increased whereby the electric current flowing through the motor 68 is increased. Further, the electric current flowing through the motor 68 is held constant since the spring 106 is not elastically deformed in the state in which the piston 30 is being pulled to be retracted by the nut member 60. This state of retraction of the piston 30 by the nut member 60 corresponds to region C indicted in FIG. 15. In this region C, since the elastic force of the spring 106 is held constant, the rotational velocity of the motor 68 is constant. Therefore, in the region C, the stroke distance and the time correspond to each other. The given first stroke distance $S_{r1}$ is a stroke distance corresponding to the time $T_C$.

Further, as shown in FIG. 15, upon transition from the region B to the region C, the electric current value is higher than the no-load-state electric current $I_B$ by at least a given first width $\Delta_{r1}$. Based on this fact, the contact of the piston 30 with the nut member 60 (that has been stopped) can be detected, namely, the start of the retraction of the piston 30 by the nut member 60 can be detected.

On the other hand, since the piston 30 is moved rearwardly by the restoring force of the elastic force generated by the elastic member such as each of the pads, as described above, the given first stroke distance $S_{r1}$ can be determined based on an amount of shortage in returning of the piston 30, which shortage is caused by an insufficiency in the elastic deformation of the piston seal 32. For example, the given first stroke distance $S_{r1}$ can be determined based on the electric current value $I_{ref}$ or the fluid pressure P upon completion of the locking of the parking brake. As described above, the parking brake is activated such that a given total brake force $F_S$ is applied constantly to the wheel during locking of the parking brake. Therefore, based on the electric current value $I_{ref}$ or the fluid pressure P upon completion of the locking of the parking brake, it is possible to estimate an amount by which the piston 30 has been moved forwardly by the nut member 60 without causing the elastic deformation of the piston seal 32, namely, it is possible to estimate an amount of the insufficiency in the elastic deformation of the piston seal 32.

Further, during the locking of the parking brake, the piston 30 is positioned in a more front position when an amount of the wear of each of the pads 16, 18 is large, than when the amount of the wear of each of the pads 16, 18 is small. Moreover, the stroke distance $S_A$ of the nut member 60, when the piston 30 is moved rearwardly by the restoring forces of the pads 16, 18, is reduced with increase of the amount of the wear of each of the pads 16, 18. On the other hand, where the clearance d and the given first stroke distance $S_{r1}$ are constant, the rearward stroke distance of the nut member 60 from its position upon the locking of the parking brake to its zero point position is shorter when the amount of wear of each of the pads 16, 18 is large than when the amount of wear of each of the pads 16, 18 is small. Therefore, the zero point position of the nut member 60 may be adjusted to be shifted forwardly, namely, may be set in a more front position when the amount of wear of each of the pads 16, 18 is large than when the amount of wear of each of the pads 16, 18 is small.

On the other hand, in a disk brake in which a return spring is disposed between a cylinder main body and a piston, the piston can be returned to a given position, but can not be returned to a position that is dependent on an amount of wear of each pad. However, in the brake apparatus constructed according to the present embodiment, there is an advantage that the piston can be returned to its zero point position that is dependent on the amount of wear of each of the pads 16, 18.

It is noted that the given first stroke distance $S_{r1}$ may be a predetermined fixed value.

4-2 Reattempting Control (a) Reverse Rotation of the Electric Motor 68

When the piston 30 is retracted too much by the nut member 60, the piston 30 is brought into contact with the stopper 130. The spring 106 is compressed with the rearward movement of the piston 30 whereby the load applied to the electric motor 68 is increased and the electric current flowing through motor 68 is increased. The electric current value is gradually increased with the compression of the spring 106, and such an increase tendency is continued. This state corresponds to region D indicated in FIG. 15.

In view of this fact, it is detected that the piston 30 has been brought into contact with the stopper 130 when the electric current value becomes not lower than a stopper-contact judgment electric-current value $I_{ths}$.

Figure 6:
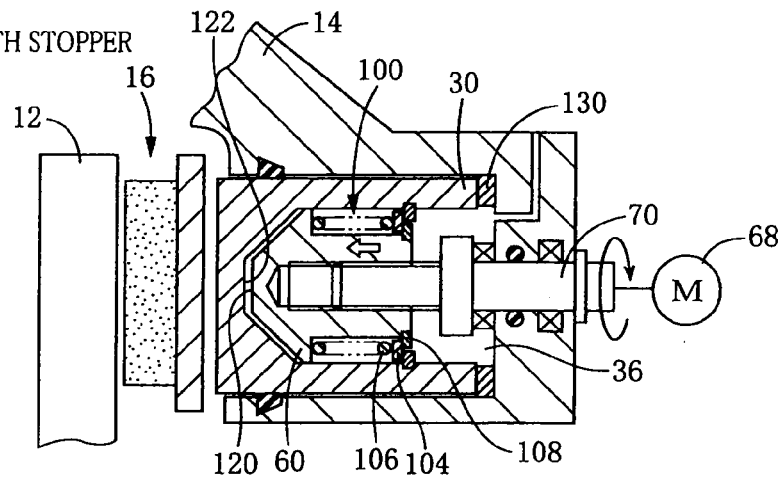
FIG. 6 is a set of views of the disk brake, showing other operational states (reattempting control) in which the parking brake is being released in the normal mode, wherein these operational states are other than the operational states shown in FIG. 5.
Figure 6:
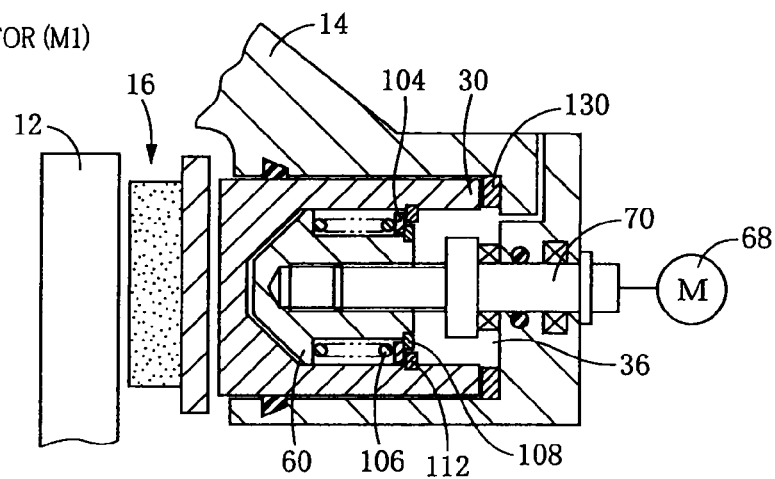
Figure 6:
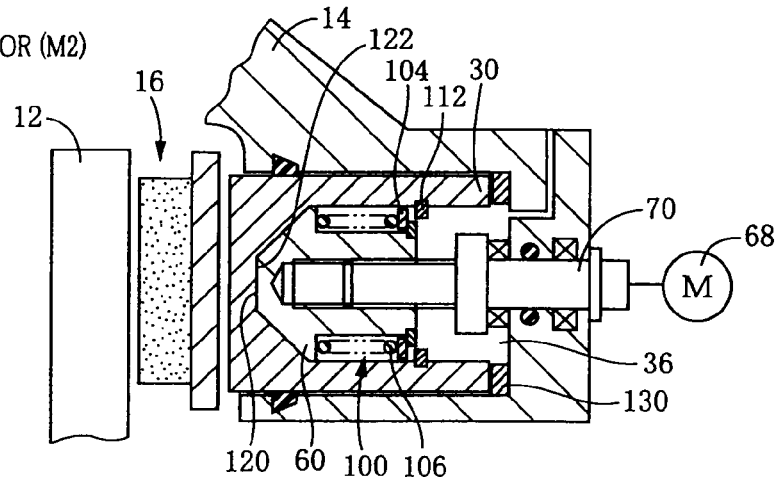

When it is detected that the piston 30 has been brought into contact with the stopper 130, a rotational direction of the electric motor 68 is inverted whereby the nut member 60 is moved forwardly as shown in FIG. 6 (*a*). Further, the piston 30 is moved forwardly by the restoring force of the elastically deformed spring 106. In this instance, the nut member 68 and the piston 30 are moved in the forward direction integrally with each other. With the forward movement of the piston 30, the amount of the elastic deformation of the spring 106 is reduced whereby the force applied to the nut member 60 is reduced. Thus, the load applied to the electric motor 68 is reduced whereby the electric current flowing through the motor 68 is gradually reduced. This state corresponds to region J indicated in FIG. 16.

(b) Forward Movement of the Nut Member 60 in the No-Load State

When the spring 106 is returned to its static state (namely, when the movable retainer 104 is brought into contact with the set-load defining portion 108) with the piston 30 being separated from the stopper 130, the piston 30 is stopped. The nut member 60 is moved forwardly within the clearance d of the piston 30, with the electric motor 68 being in its no-load state. This state corresponds to region K indicated in FIG. 16.

Upon transition from the region J to the region K, the rate of reduction of the electric current is abruptly reduced, and the electric current value becomes extremely low.

In view of this fact, the transition from the region J to the region K is detected when the electric current has become not higher than a given second value $I_{r2}(=I_B+\alpha)$ that is dependent on the no-load-state electric current value $I_B$ stored during movement of the nut member 60 in the region B.

It is noted that the transition from the region J to the region K may be detected also based on the rate of change of the electric current as described above.

Further, it is not essential that the given second value $I_{r2}$ is a value determined based on the stored no-load-state electric current $I_B$, but may be a value equal to, for example, the given first value $I_{r1}$.

Figure 16:
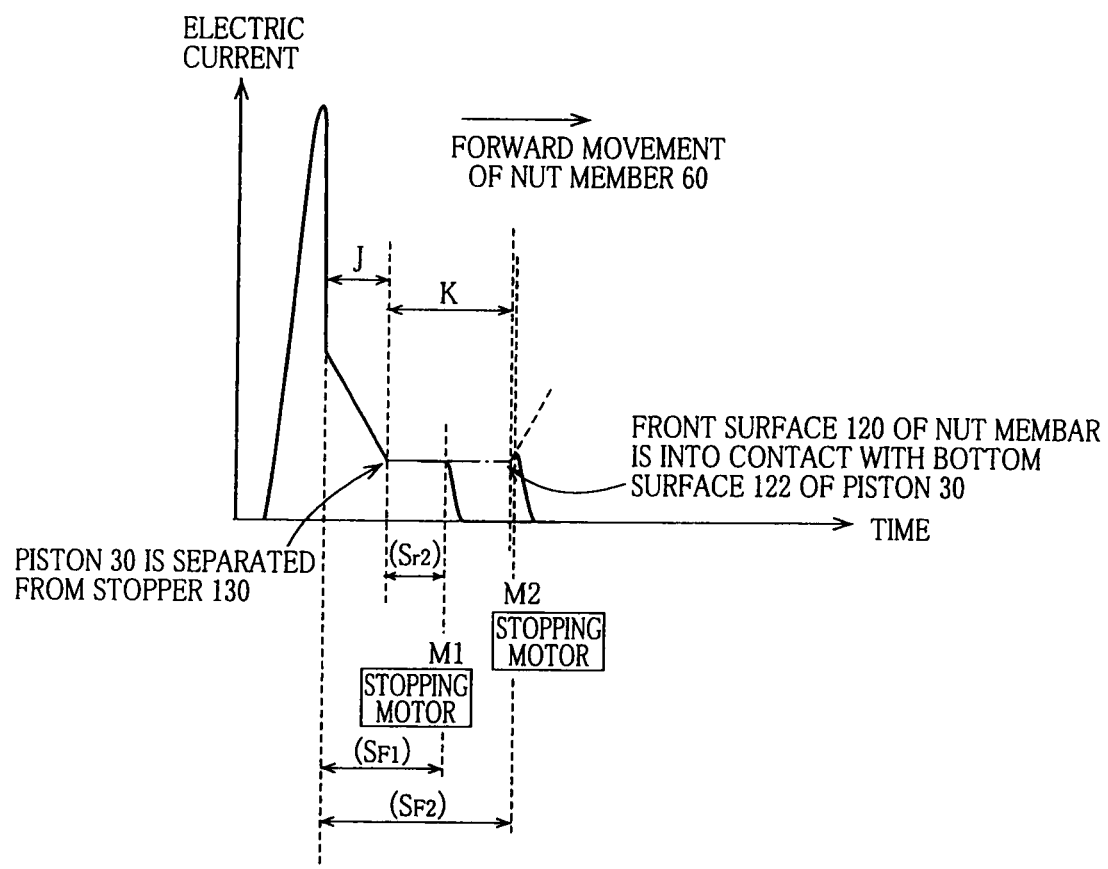
FIG. 16 is a view showing change of the electric current flowing through the electric motor in execution of a reattempting control of the parking brake.

(c) Stop of the Electric Motor 68 (at Point of Time M1 in FIG. 16)

When the nut member 60 has been moved forwardly by a given second stroke distance $S_{r2}$ from the detection of the transition from the region J to the region K, the electric motor 68 is stopped as shown in FIG. 6 (*b*), so that the nut member 60 is positioned in its zero point position (i.e., a brake-non-activation position as shown in FIG. 2).

As shown in FIG. 15, the stroke distance $S_E$ of the nut member 60 in a period from the start of the retraction of the piston 30 to the contact of the piston 30 with the stopper 130 corresponds to an amount of movement of the nut member 60, which is made since a positive judgment (YES) is obtained in step S86 until a positive judgment (YES) is obtained in step S90. Further, it is possible to obtain, in advance, a stroke distance (time) $\Delta_S$ from a point of time at which the piston 30 is brought into contact with the stopper 130 until a point of time at which the electric current value reaches the stopper-contact-judgment electric-current-value $I_{ths}$. Further, the given first stroke distance $S_{r1}$ is a known value. It is obvious from FIG. 15 that the given second stroke distance $S_{r2}$ can be obtained by subtracting the given first stroke distance $S_{r1}$ and the stroke distance $\Delta_S$ from the stroke distance $S_E$.

$$S_{r2}=S_E-S_{r1}-\Delta_S$$

It is noted that the given second stroke distance $S_{r2}$ may be zero or a predetermined fixed value larger than zero.

(d) Stop of the Electric Motor 68 (at Point of Time M2 in FIG. 16)

On the other hand, where the nut member 60 failed to be stopped in its zero point position for some reasons, as shown in FIG. 6 (*c*), the electric motor 68 is stopped (at the point of time M2 in FIG. 16) upon detection of contact of the front end surface 120 of the nut member 60 with the inside bottom surface 122 of the piston 30, namely, upon abrupt increase of the electric current.

Based on this fact, the contact of the front end surface 120 of the nut member 60 with the inside bottom surface 122 of the piston 30 is detected when the electric current value has been increased by at least a given second width $\Delta_{r2}$ from the no-load-state electric current $I_B$. In this case, the nut member 60 is stopped in a position located on a front side of the zero point position that is indicated in FIG. 2.

Figure 11:
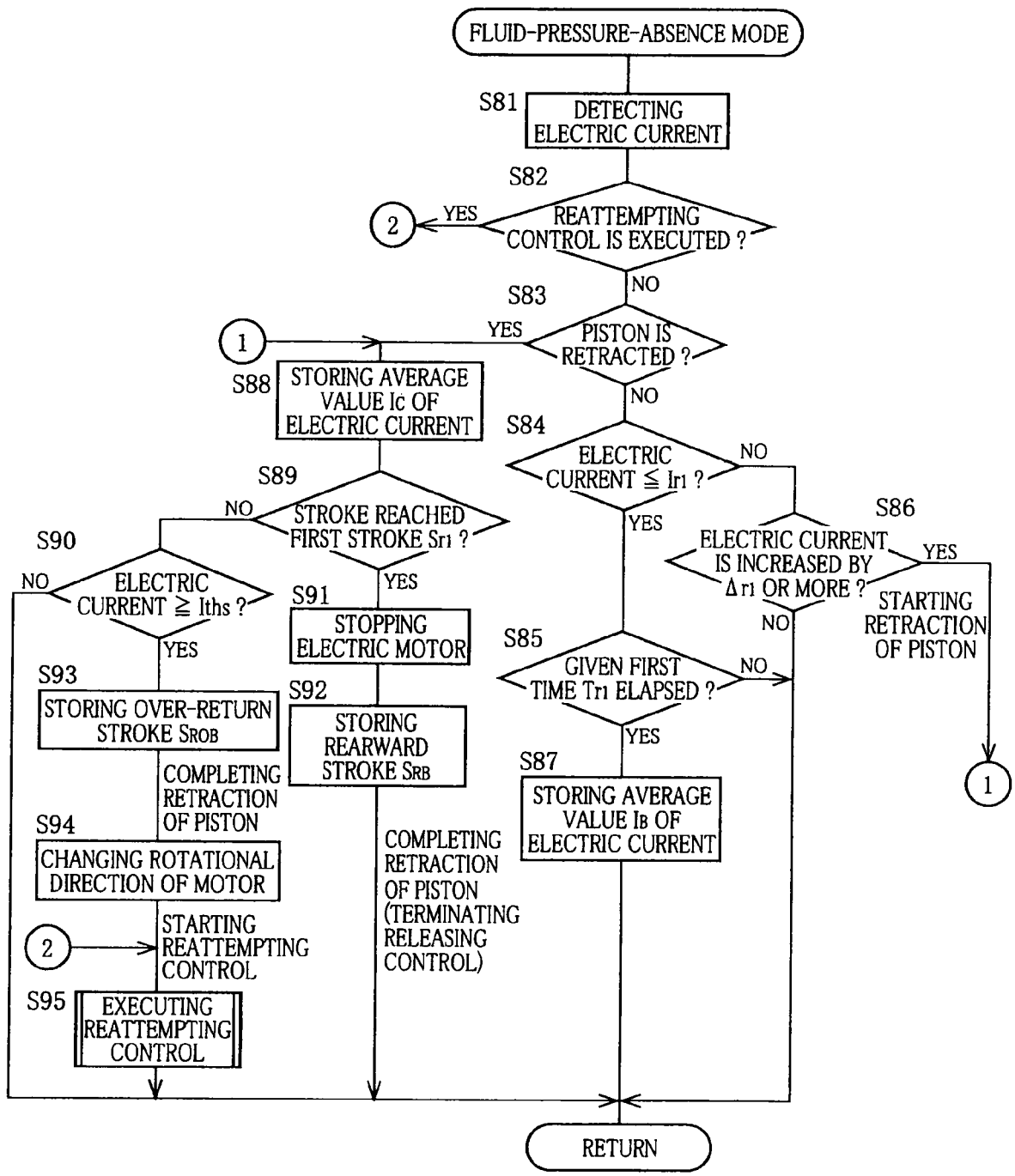
FIG. 11 is a flow chart showing a part (releasing control in the normal mode) of the parking-release-state motor control program.

In the fluid-pressure-absence mode of step S62, the releasing control is executed in accordance with a flow chart of FIG. 11.

Step S81 is implemented to read the detected value detected by the electric current sensor 168. Step S82 is implemented to judge whether the reattempting control is being executed or not. Step S83 is implemented to judge whether or not the piston 30 is being pulled to be retracted. When steps S82 and S83 are implemented for the first time, negative judgments (NO) are obtained in steps S82 and S83, and then steps S84 and S85 are implemented to judge whether or not the electric motor 68 is in its no-load state. This state corresponds to the region B indicated in FIG. 15.

When step S84 is implemented for the first time, a negative judgment (NO) is obtained in step S84, since the electric current value is higher than the given first value $I_{r1}$ during the region A. In this case, step S84 is followed by step S86 also in which a negative judgment (NO) is obtained since the electric current value is not increased by the given first width $\Delta_{r1}$ or more during the region A. Steps S81-S84 and S86 are repeatedly implemented until the electric current value becomes not higher than the given first value $I_{r1}$. When the electric current value has become not higher than the given first value $I_{r1}$, step S85 is implemented to judge whether the electric current value has been kept not higher than the given first value $I_{r1}$, for the given first time $T_{r1}$ or not. Steps S81-S85 are repeatedly implemented until the given first time $T_{r1}$ has passed. When the given first time $T_{r1}$ has passed, a positive judgment (YES) is obtained in step S85 and the control flow goes to step S87 in which the electric current value is stored. Thus, while the nut member 60 is being moved rearwardly within the clearance d, steps S81-S85 and S87 are repeatedly implemented. In the present embodiment, the average value $<I_B>$ of the electric current is obtained and the obtained average value $<I_B>$ is stored as the no-load-state electric current $I_B$.

When the engaging portion 100 of the nut member 60 is brought into contact with the engaged portion 112 of the piston 30 after repeated implementations of steps S81-S85 and S87, the electric current value is increased from the no-load-state electric current $I_B$ by the given first width $\Delta_{r1}$ or more, so that a negative judgment (NO) is obtained in step S84 and a positive judgment (YES) is obtained in step S86. Thus, the transition from the region B to the region C indicated in FIG. 15, i.e., the start of retraction of the piston 30 is detected. For example, a retraction flag is set when the piston 30 starts to be pulled to be retracted.

Thereafter, in step S88, an average value <$I_C$> of the electric current is obtained and the obtained average value <$I_C$> is stored as a retraction electric current $I_C$. Then, in step S89, it is judged whether or not the stroke distance of the nut member 60 from the start of retraction of the piston 30 (i.e., from the positive judgment (YES) in step S86) has reached the given first stroke distance $S_{r1}$. In step S90, it is judged whether or not the electric current value has become not lower than the stopper-contact-judgment electric-current-value $I_{ths}$. While the piston 30 is being pulled to be retracted, a negative judgment (NO) is obtained in step S90, since the electric current is kept constant during the retraction of the piston 30.

When the present program is being executed, the piston 30 is being pulled to be retracted (for example, the retraction fag is being set), so that a positive judgment (YES) is obtained in step S83. Then, in step S88, an average value <$I_C$> of the electric current value is obtained. In step S89, it is judged whether or not the actual stroke distance of the nut member 60 has been reached the given first stroke distance $S_{r1}$.

Before the stroke distance of the nut member 60 reaches the given first stroke distance $S_{r1}$, steps S81-S83 and S88-S90 are repeatedly implemented. In most cases, the stroke distance of the nut member 60 reaches the given first stroke distance $S_{r1}$ before the electric current value becomes not lower than the stopper-contact-judgment electric-current-value $I_{ths}$, so that a positive judgment (YES) is obtained in step S89. In step S91, the electric motor 68 is stopped whereby the nut member 60 and the piston 30 are stopped. In step S92, the rearward stroke distance $S_{RB}$ as a stroke distance (i.e., stroke distance from the implementation of step S58 until the implementation of step S91) by which the nut member 60 has been actually moved rearwardly in the present releasing control, is stored in the storage portion 154 so as to be updated. Thus, the releasing action is completed whereby the releasing control is terminated. For example, the retraction flag is reset and the releasing control flag is reset.

On the other hand, when the electric current value becomes not lower than the stopper-contact-judgment electric-current-value $I_{ths}$ before the stroke distance of the nut member 60 reaches the given first stroke distance $S_{r1}$, for some reasons, a positive judgment (YES) is obtained in step S90. That is, as a result of repeated implementations of steps S81-S83, S89, S90, the piston 30 is brought into contact with the stopper 130 whereby the electric current value becomes not lower than the stopper-contact-judgment electric-current-value $I_{ths}$.

In step S93, an over-return stroke distance $S_{ROB}$ is stored. Thus, the retraction of the piston 30 is completed, and the retraction flag is reset. As shown in FIG. 15, the over-return stroke distance $S_{ROB}$ is a stroke distance of the nut member 60 from its position upon the locking of the parking brake until the detection that the piston 30 has been brought into contact with the stopper 130 (i.e., stroke distance from the implementation of step S58 until a positive judgment (YES) is obtained in step S90). Thereafter, step S94 is implemented to change the rotational direction of the electric motor 68, and the reattempting control is initiated (reattempting control flag is set). Then, step S95 is implemented to execute the reattempting control.

Figure 12:
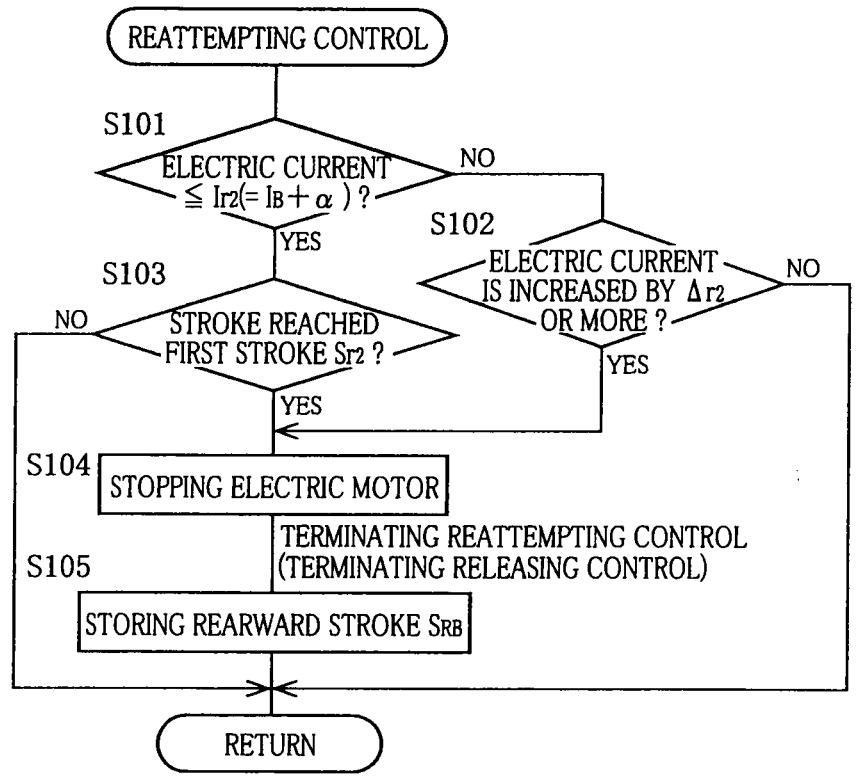
FIG. 12 is a flow chart showing a part (reattempting control) of the parking-release-state motor control program.

The reattempting control of step S95 is executed in accordance with flow chart of FIG. 12.

In step S101, it is judged whether the electric current value is not higher than a given second value $I_{r2}$ ($=I_B+\alpha$) that is determined based on the no-load-state electric current $I_B$. The value $\alpha$, which is close to zero, may be also zero. When the electric current value is higher than the given second value $I_{r2}$, step S102 is implemented to judge whether the electric current value has been increased from the no-load-state electric current $I_B$ by at least the given second width $\Delta I_{r2}$. At an initial stage of the execution of the reattempting control, the electric current value is in region J shown in FIG. 16, so that a negative judgment (NO) is obtained in either one of steps S101 and S102, whereby steps S81, S82, S101 and S102 are repeatedly implemented.

Then, when the electric current value becomes not higher than the given second value $I_{r2}$, it is detected that the electric current value has been placed in region K shown in FIG. 16. In this instance, the nut member 60 is moved forwardly without a load being applied to the electric motor 68. Then, in step S103, it is judged whether or not the (forward) stroke distance of the nut member 60 from a positive judgment (YES) obtained in step S101 has reached the given second stroke distance $S_{r2}$. Before the actual forward stroke distance of the nut member 60 reaches the given second stroke distance $S_{r2}$, steps S81, S82, S101 and S103 are repeatedly executed. When the actual forward stroke distance of the nut member 60 has reached the given second stroke distance $S_{r2}$, a positive judgment (YES) is obtained in step S103 whereby step S104 is implemented to stop the electric motor 68. Thus, the reattempting control and the releasing control are completed, and the reattempting control flag and the releasing control flag are reset.

Thereafter, in step S105, the rearward stroke distance $S_{RB}$ is stored (M1). The rearward stroke distance $S_{RB}$ is a value that is obtained by subtracting a forward movement stroke distance $S_{F1}$ from the stored over-return stroke distance $S_{ROB}$, wherein the forward movement stroke distance $S_{F1}$ is a stroke distance by which the nut member 60 has been moved forwardly (from the implementation of step S94 until the implementation of step S104) in the reattempting control.

$$S_{RB}=S_{ROB}-S_{F1}$$

On the other hand, when it could not be detected that the electric current value is in the region K, for some reason, or when the electric current value has become not lower than the given second value $I_{r2}$, before reaching the given second stroke distance $S_{r1}$, a negative judgment (NO) is obtained in step S101. In step S102, it is judged whether the electric current value has been increased from the no-load-state electric current $I_B$ by the given second width $\Delta_{r2}$ or more. When the nut member 60 has been brought into contact with the inside bottom surface 122 of the piston 30 as a result of the forward movement of the nut member 60 relative to the piston 30 within the clearance d, a positive judgment (YES) is obtained in step S102. In steps S104 and S105, the electric motor 68 is stopped and the rearward stroke distance $S_{RB}$ is stored (M2). The rearward stroke distance $S_{RB}$ is a value that is obtained by subtracting a forward movement stroke distance $S_{F2}$ from the stored over-return stroke distance $S_{ROB}$, wherein the forward movement stroke distance $S_{F2}$ is a stroke distance by which the nut member 60 has been moved forwardly in the reattempting control. In this case, the nut member 60 is stopped in a slightly more front position than in a case where a positive judgment (YES) is obtained in step S103.

$$S_{RB}=S_{ROB}-S_{F2}$$

In the reattempting control, where the electric motor 68 has been stopped, the rearward stroke distance $S_{RB}$ may not be stored. Further, the rearward stroke distance $S_{RB}$ may not be stored where the motor 68 has been stopped at the point of time M2, while the rearward stroke distance $S_{RB}$ is stored where the motor 68 has been stopped at the point of time M1.

Further, the judgment made in step S130 is not essential. That is, the given second stroke distance $S_{r2}$ may be set to zero. Depending on the construction of the disk brake 10 or the value of the given first stroke distance $S_{r1}$, there is a case where a point with the given second stroke distance $S_{r2}$ being zero corresponds to the zero point position indicated in FIG. 2.

4-3 Releasing Control with Fluid-Pressure-Presence Mode

Figure 13:
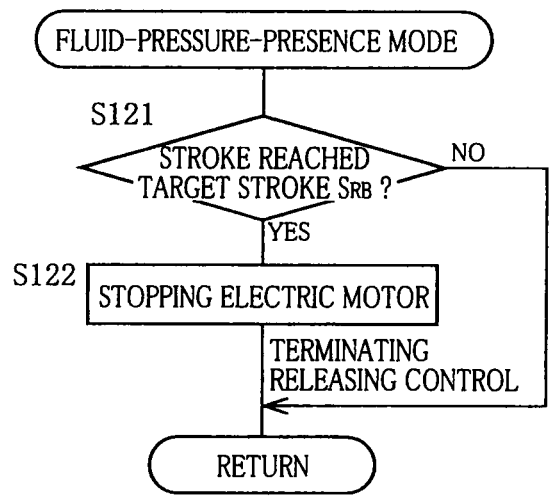
FIG. 13 is a flow chart showing a part (releasing control in the fluid-pressure-presence mode) of the parking-release-state motor control program.

The releasing control with the fluid-pressure-presence mode in step S63 is executed in accordance with flow chart of FIG. 13.

In step S121, it is judged whether the actual stroke distance of the nut member 60 from its position upon the locking of the parking brake has reached the target stroke distance $S_{ref}$. Before the stroke distance reaches the target stroke distance $S_{ref}$, steps S51, S59 and S63 are repeatedly implemented, or steps S51, S59-S61, S64, S65 and S63 are repeatedly implemented in some cases. Then, when the actual stroke distance has reached the target stroke distance Sref, step S122 is implemented to stop the electric motor 68. The releasing control is terminated with the implementation of step S122, and the releasing control flag is reset.

Figure 7:
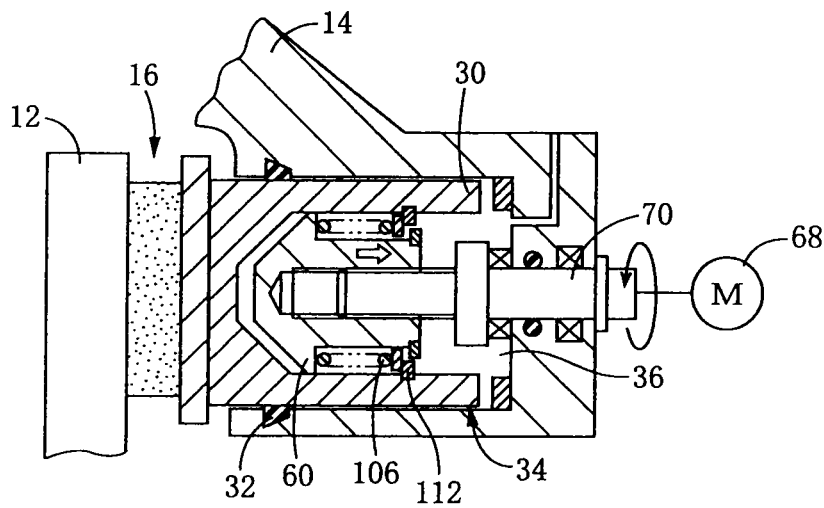
FIG. 7 is a view of the disk brake, showing still another operational state (in which the parking brake is being released in a fluid-pressure-presence mode).

As shown in FIG. 7, the nut member 60 is stopped in its zero point position in a state in which the spring 106 is being compressed. Meanwhile, the piston 30 is positioned in a position that is determined depending on the fluid pressure in the brake cylinder 34.

Thereafter, when the fluid pressure in the fluid pressure chamber 36 is returned to the atmospheric chamber as a result of release of the service brake, the piston 30 is moved rearwardly by the restoring forces of the elastic members such as the pads. In this instance, even if the piston 30 cannot be returned to its zero point position by the restoring forces of the elastic members such as the pads, the piston 30 can be moved rearwardly, by the restoring force of the spring 106, to a position that is dependent on the nut member 60.

As described above, during the locking of the parking brake, the parking brake force is controlled such that the predetermined total brake force $F_S$ is obtained. To this end, the nut member 60 is positioned in the locking position, which is located in a more front position where the amount of wear of each of the pads 16, 18 is large, than where the wear amount is small. By causing the nut member 60 to be moved rearwardly from the locking position by the target stroke distance $S_{ref}$, the nut member 60 is positioned in its zero point position, which is located in a more front position where the amount of wear of each of the pads 16, 18 is large, than where the wear amount is small. Thus, the zero point position of the nut member 60 can be set to a position that is adjusted depending on the amount of wear of each of the pads 16, 18.

Further, the target stroke distance $S_{ref}$ is updated through learning whereby the zero point position of the nut member 60 can be suitably adjusted depending on the actual wear amount, so that the piston 30 can be returned to its zero point position.

As described above, in the present embodiment, in the disk brake 10, the nut member 60 is provided with the spring 106 that is engageable with the piston 30, so that, upon release of the parking brake, the piston 30 can be satisfactorily moved rearwardly to the zero point position, whereby the brake dragging can be prevented and the delay in response of the brake can be restrained.

Further, since the spring 106 is in a state in which the spring 106 is compressible (elastically deformable) while the releasing control is being executed for the parking brake or while the nut member 60 is being positioned in its zero point position, the piston 30 can be moved forwardly by the fluid pressure in the brake cylinder 34 so as to activate the service brake even during the activation of the parking brake.

Further, since an increase of the amount of wear of each of the pads 16, 18 leads to a reduction of the restoring forces, the increase of the wear amount leads to a reduction of the stroke distance by which the piston 30 is moved rearwardly by the restoring forces of the elastic members such as the pads. However, in the releasing control with the fluid-pressure-absence mode, the nut member 60 is moved rearwardly by the given first stroke distance $S_{r1}$ after the nut member 60 has been brought into contact with the piston 30, so that the zero point position can be set to a position that is adjusted depending on the amount of wear of each of the pads 16, 18. In this case, the position of the nut member 60 relative to the rotary shaft 70 is shifted forwardly.

As described above, in the present embodiment, a power drive device is constituted by a cooperation of, for example, the electric motor 68, rotation transmitting mechanism 66 and motion converting mechanism 64. Further, an electric-motor control device is constituted by a cooperation of, for example, portions of the brake ECU 150 which are assigned to store and execute the parking-locked-state motor control program and the parking-release-state motor control program shown by the respective flow charts of FIGS. 9 and 10. The electric-motor control device serves also as a fluid-pressure-basis electric-motor control device.

Further, a no-load rearward-movement detecting portion is constituted by a cooperation of, for example, portions of the electric-motor control device which are assigned to store and implement steps S84 and S85. A retraction-start detecting portion is constituted by a cooperation of, for example, portions of the electric-motor control device which are assigned to store and implement step S86. A retraction-movement controlling portion is constituted by a cooperation of, for example, portions of the electric-motor control device which are assigned to store and implement steps S89 and S91.

Further, a reattempt controlling portion is constituted by a cooperation of, for example, portions of the electric-motor control device which are assigned to store and implement steps S94 and S95. A no-load forward-movement detecting portion is constituted by a cooperation of, for example, portions of the reattempt controlling portion which are assigned to store and implement step S101. A first reattempt controlling portion is constituted by a cooperation of, for example, portions of the reattempt controlling portion which are assigned to store and implement steps S103 and S104. A forward-contact detecting portion is constituted by a cooperation of, for example, portions of the reattempt controlling portion which are assigned to store and implement step S102. A second reattempt controlling portion is constituted by a cooperation of, for example, portions of the reattempt controlling portion which are assigned to store and implement step S104.

Embodiment 2

Figure 17:
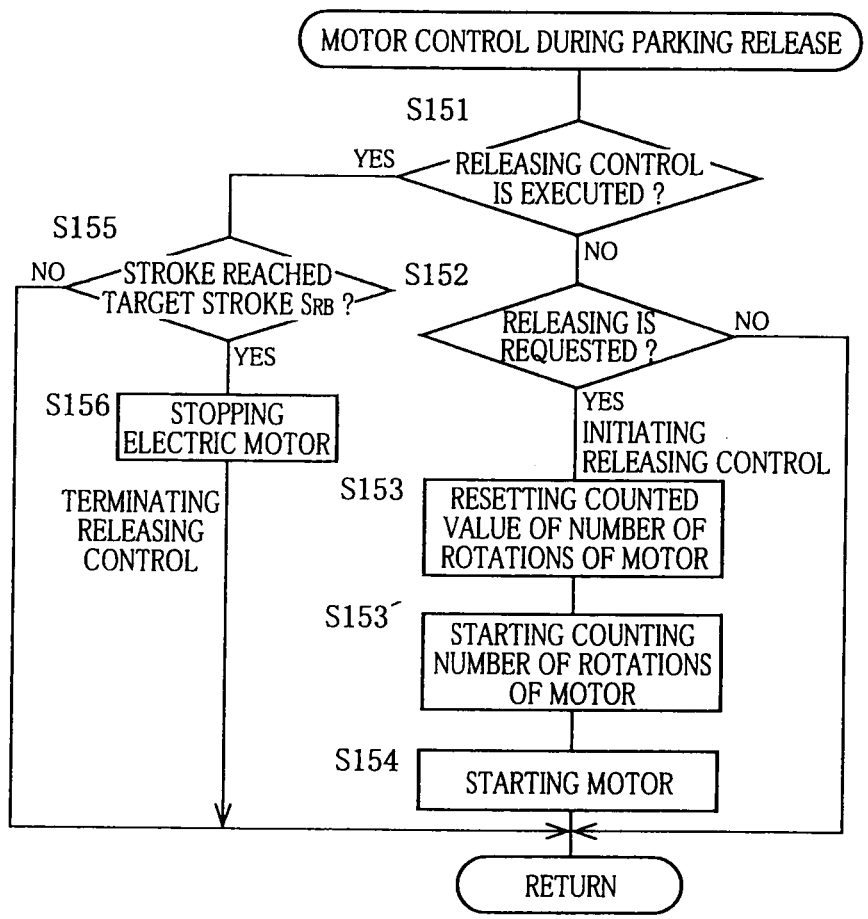
FIG. 17 is a flow chart showing another parking-release-state motor control program that is stored in the storage portion of the brake ECU (in embodiment 2).

In the above-described embodiment, the release-state motor control is executed in a manner that varies depending on whether the service brake is in its activated state or in its non-activated state. However, in the execution of the release-state motor control, the nut member 60 may be moved rearwardly by the target stroke distance in the form of a distance that is predetermined irrespective of the operational state of the service brake. The predetermined distance as the target stroke distance may be a value which avoids the brake dragging and also the delay in response of the brake where the amount of wear of each of the pads 16, 18 is a standard amount. FIG. 17 is a flow chart showing an example of the parking-release-state motor control program in this embodiment.

This program is initiated with step S151 that is implemented to judge whether the electric motor 68 is being subjected to a releasing control. When the motor 68 is not being subjected to the releasing control, the control flow goes to step S152 that is implemented to judge whether the releasing of the parking brake is requested or not. When the releasing request is detected, the releasing control is started for the electric motor 68. In step S153, a counted value of number of rotations of the motor 68 at a current point of time is reset (cleared). Step S153 is followed by step S153' that is implemented to start counting the number of rotations of the motor 68 in the present releasing control. Then, in step S154, the electric motor 68 is started.

On the other hand, when the motor 68 is being subjected to the releasing control, a positive judgment (YES) is obtained in step S151 whereby the control flow goes to step S155 that is implemented to judge whether the rearward stroke distance of the nut member 60 from the locking position for the parking brake (i.e., from the implementation of step S153) has reached the target stroke distance $S_{RB}$.

Before the stroke distance of the nut member 60 reaches the target stroke distance in the releasing control, steps S151 and S155 are repeatedly implemented and the rearward movement of the nut member 68 is continued. When the stroke distance of the nut member 60 has reached the target stroke distance, a positive judgment (YES) is obtained in step S155 whereby the control flow goes to step S156 in which the electric motor 68 and the nut member 60 are stopped. The releasing control is terminated with the implementation of step S156.

When the service brake is not activated upon the execution of the releasing control, or when the service-brake operating member 174 is not operated during the execution of the releasing control, the piston 30 is moved rearwardly together with the rearward movement of the nut member 60, so as to be positioned in a position that is determined depending on the nut member 60. That is, the piston 30 and the nut member 60 are moved rearwardly to their respective zero point positions.

When the service brake is activated upon the execution of the releasing control, or when the service-brake operating member 174 is operated during the execution of the releasing control, only the nut member 60 is moved rearwardly by the target stroke distance while the piston 30 is positioned in a position that is determined depending on the fluid pressure in the brake cylinder 34. While the nut member 60 and the piston 30 are thus positioned in their respective zero point positions, the spring 106 is being compressed. Thereafter, the piston 30 is moved rearwardly by release of the service brake. In this instance, even if the restoring forces of the elastic members such as the pads are so small that the piston 30 can not be returned to its zero point position, the restoring force of the spring 106 enables the piston 30 to be returned to a position determined by the nut member 60, i.e., to a position (i.e., zero point position) in which the spring 106 is in its static state.

Thus, in the present embodiment, irrespective of presence or absence of the fluid pressure in the brake cylinder 34, the piston 30 can be returned to its zero point position by the spring 106, thereby making it possible to prevent the brake dragging and to restrain delay in response of the brake.

Embodiment 3

Figure 18:
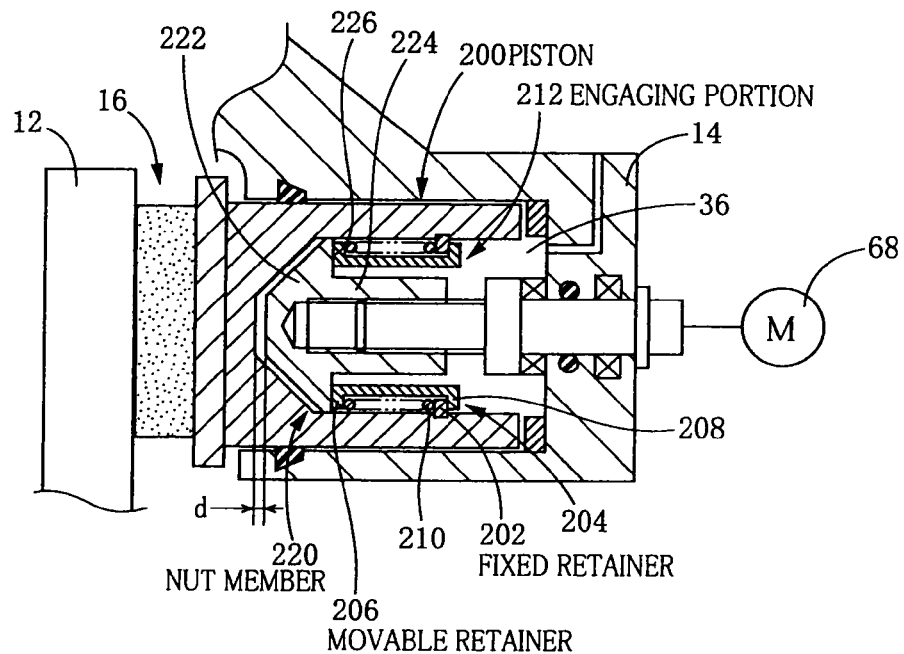
FIG. 18 is a cross sectional view showing a part of another disk brake included in the brake apparatus (in embodiment 3).

In the above-described embodiments, the engaging portion 100 is held by the nut member 60. However, the engaging portion 100 may be held by the piston 30, as shown in FIG. 18 by way of example.

A fixed retainer 202 is provided in an opening-side portion of a cylindrical wall portion of a piston 200, and protrudes radially inwardly. A movable-retainer holding portion 204 is held by the piston 200 such that the fixed retainer 202 is sandwiched by the movable-retainer holding portion 204 and such that the movable-retainer holding portion 204 is movable in the axial direction relative to the piston 200. The movable-retainer holding portion 204 has a hollow cylindrical shape, and has protruding portions 206, 208 protruding radially outwardly from respective axially end portions of the movable-retainer holding portion 204. The front-side protruding portion 206 is constituted by a flange, and serves as a movable retainer. Between the movable retainer 206 and the fixed retainer 202, a spring 210 is disposed.

Like in the above-described embodiments, the spring 210 is given a certain value of set load in a state in which the rear-side protruding portion 208 is in contact with the fixed retainer 202, wherein the certain value of set load is a designed value that does not cause elastic deformation of the spring 210 when the piston 200 is moved rearwardly together with rearward movement of a nut member 220. In this sense, it is possible to consider that the rear-side protruding portion 208 and the fixed retainer 202 cooperate to constitute a set-load defining portion.

In the present embodiment, the fixed retainer 202, movable-retainer holding portion 204 and spring 210 cooperate with one another to constitute at least a part of an engaging portion 212.

On the other hand, an engaged portion is constituted by an annular-shaped shoulder surface 226 of the nut member 220 which interconnects between a large diameter portion 222 and a small diameter portion 224 of the nut member 220. The engaged portion 226 is located on a front side of the spring 210. Further, the engaged portion 226 (large diameter portion 222) can be regarded as a member that protrudes radially outwardly from the small diameter portion 224 of the nut member 220.

In the electric brake apparatus according to the embodiment 3, substantially the same operations are performed as in each of the electric brake apparatuses according to the embodiments 1 and 2.

For example, when the service-brake operating member 174 is operated in a state shown in FIG. 18, the fluid pressure is supplied to the fluid pressure chamber 36 whereby the piston 200 is moved forwardly relative to the nut member 220. As a result of forward movement of the fixed retainer 202 with the movable retainer 206 being in contact with the engaged portion 226, a distance between the movable retainer 206 and the fixed retainer 202 is reduced whereby the spring 210 is compressed. As a result of forward movement of the piston 200, the service brake is activated.

When the parking brake switch 162 is operated for locking the parking brake, the electric motor 68 is rotated whereby the nut member 220 is moved forwardly. The nut member 220 is brought into contact with the piston 200 whereby the piston 200 is moved forwardly, so as to activate the parking brake. During the activated state of the parking brake, the engaged portion 226 of the nut member 220 is positioned in a position that is distant from the movable retainer 206 of the piston 200 by a distance equal to the clearance d.

When the releasing operation is carried out, the nut member 220 is moved rearwardly and also the piston 200 is moved rearwardly, as in the above-described embodiments. When the piston 200 is stopped and the engaged portion 226 of the nut member 220 is brought into contact with the movable retainer 206 of the piston 200, the piston 200 is moved rearwardly together with rearward movement of the nut member 220. When the piston 200 has reached its zero point position, the electric motor 68 is stopped.

Embodiment 4

Figure 19:
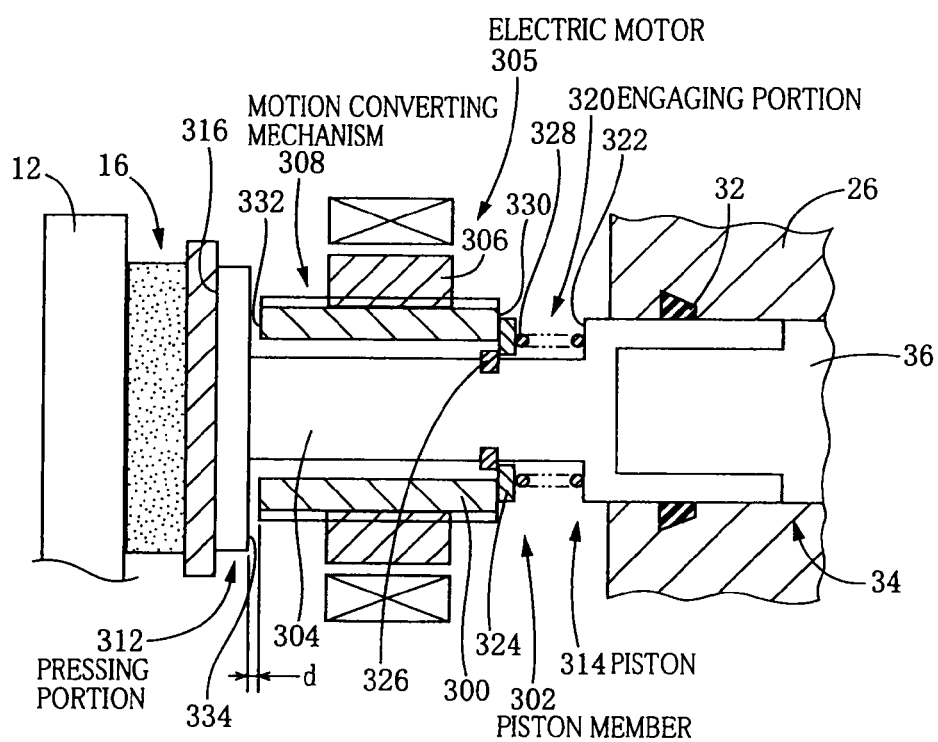
FIG. 19 is a cross sectional view showing a part of still another disk brake included in the brake apparatus (in embodiment 4).

In the above-described embodiments, the piston and the driven member overlap with each other in the radial direction such that the piston is located on a radially outer side of the driven member while the driven member is located on a radially inner side of the piston. However, the piston and the driven member may be arranged such that the driven member is located on a radially outer side of the piston while the piston is located on a radially outer side of the driven member, as schematically shown in FIG. 19 by way of example.

In the present embodiment, a piston rod 304 of a piston member 302 is disposed on a radially inner side of the nut member 300 having a generally cylindrical shape, and extends in the axial direction. The driven member 300 is held by the caliper such that the driven member 300 is movable relative to the caliper in the axial direction together with rotation of the electric motor 305 and unrotatable relative to the caliper. An externally threaded portion is provided in an outer circumferential surface of the driven member 300, while an internally threaded portion is provided in an inner circumferential surface of a rotary portion 306 that is rotatable integrally with a rotor of the electric motor 305, such that the externally threaded portion of the driven member 300 and the internally threaded portion of the rotary portion 306 are held in thread engagement with each other. The externally threaded portion and the internally threaded portion cooperate to constitute a motion converting mechanism 308 having a locking mechanism.

The piston member 302 includes a pressing portion 312 and a piston 314 that are provide in respective front-side and rear-side portions of the piston member 302. The pressing portion 312 and the piston 314 are connected to each other through a piston rod 304, so as to be movable in the axial direction integrally with each other. A front end surface of the pressing portion 312 is opposed to the pad 16, while a rear end surface of the piston 314 is opposed to the fluid pressure chamber 36.

Further, an engaging portion 320 is provided in the piston member 302. The engaging portion 320 includes a fixed retainer 322, a movable retainer 324, a set-load defining portion 326 and a spring 328. In the present embodiment, the fixed retainer 322 is constituted by a front-side surface of the piston 314. Further, the set-load defining portion 326 is fixedly provided in an intermediate portion of the piston rod 304, and protrudes radially outwardly. Further, between the fixed retainer 322 and the set-load defining portion 326, the movable retainer 324 that is constituted by an annular-shaped plate is disposed and movable in the axial direction relative to the piston rod 304. The spring 328 is disposed between the movable retainer 324 and the fixed retainer 322. Like in the above-described embodiments, the spring 328 is given a certain value of set load in a state in which the movable retainer 324 is in contact with the set-load defining portion 326, wherein the certain value of set load is a designed value that does not cause elastic deformation of the spring 328 when the piston 314 is moved rearwardly together with rearward movement of the driven member 300.

The driven member 300 has a rear end surface that constitutes an engaged portion 330. In the present embodiment, the engaged portion 330 does not protrude in the radial direction.

Further, in the state in which the movable retainer 324 and the set-load defining portion 326 are in contact with each other, a clearance d is defined between a front end surface 332 of the driven member 300 and a rear end surface 334 of the pressing portion 312 of the piston member 302.

Further, in the embodiment 4, the electric motor 305 is disposed in a position close to the disk rotor 12 while the brake cylinder 34 is disposed in a position far from the disk rotor 12.

In the electric brake apparatus according to the embodiment 4, substantially the same operations are performed as in each of the electric brake apparatuses according to the embodiments 1 and 2.

For example, when the fluid pressure is supplied to the fluid pressure chamber 36 in a state shown in FIG. 19, the piston member 302 is moved forwardly relative to the driven member 300, causing the spring 328 to be compressed. As a result of the forward movement of the piston 302, the service brake is activated.

Upon detection of a locking request requesting the parking brake to be locked, the driven member 300 is moved forwardly by activation of the electric motor 305. The front end surface 332 of the driven member 300 is brought into contact with the rear end surface 334 of the pressing member 312, so that the piston member 312 is moved forwardly together with the forward movement of the driven member 300 whereby the parking brake is activated.

Upon detection of a releasing request requesting the parking brake to be released, the driven member 300 is moved rearwardly. The driven member 300 and the piston member 302 are moved rearwardly integrally with each other, and then the piston member 302 is stopped so that the driven member 300 is moved rearwardly relative to the piston member 302, whereby the engaged portion 330 is brought into contact with the movable retainer 324. After the engaged portion 330 has been brought into contact with the movable retainer 324, the piston member 302 is moved rearwardly together with rearward movement of the driven member 300. When the driven member 300 has reached its zero point position, the electric motor 305 is stopped whereby the driven member 300 and the piston member 302 are stopped.

There have been described the plurality of embodiments of the present invention. However, in the embodiment 1, the electric motor 68 may be disposed in series with the brake cylinder 34. Further, the screw mechanism does not necessarily have to have the locking function. Instead, the speed reducer disposed between the electric motor and the rotary shaft may be adapted to have a locking mechanism. Moreover, the clearance does not necessarily have to be provided between the piston and the driven member. The present invention may be otherwise embodied with various modifications and improvements that are based on knowledge of those skilled in the art.

DESCRIPTION OF REFERENCE SIGNS

10: disk brake 12: disk rotor 14: caliper 16, 18: pads 26: cylinder main body 30: piston 32: piston seal 34: brake cylinder 38: fluid pressure source 60: nut member 64: motion converting mechanism 66: rotation transmitting mechanism 68: electric motor 70: rotary shaft 100: engaging portion 102: fixed retainer 104: movable retainer 106: spring 108: set-load defining portion 150: brake ECU 160: fluid pressure sensor 162: parking brake switch 164: service brake switch 168: electric current sensor

The invention claimed is:

1. A brake apparatus for restraining rotation of a wheel of a vehicle by application of a brake that is to be activated for causing a friction member held by a non-rotatable body, to be pressed against a brake rotor that is to be rotated together with the wheel, through a piston that is movable in an axial direction of said piston, said brake apparatus comprising:
a power drive device;
another drive device in addition to said power drive device;
a driven member that is to be moved, by said power drive device, relative to said piston in said axial direction;
an engaging portion that is provided in one of said driven member and said piston, such that said piston is held in engagement with said driven member through said engaging portion;
an engaged portion which is provided in the other of said driven member and said piston and which is to be engaged with said engaging portion,
wherein said piston is activated by a driving force of said another drive device,
wherein said engaging portion is disposed such that, during release of the application of said brake, said piston is movable rearwardly while being held in engagement with said driven member through said engaging portion, and
wherein said engaged portion is spaced apart from said engaging portion by a clearance in said axial direction, when said driven member and said piston are brought into contact in said axial direction.

2. The brake apparatus according to claim 1, wherein said engaged portion which is provided in the other of said driven member and said piston is to be engaged with a spring, and
wherein said piston is allowable, by elastic deformation of said spring that is to be caused upon contact of said engaged portion with said spring, to be moved forwardly relative to said driven member.

3. The brake apparatus according to claim 2,
wherein said one of said driven member and said piston includes
(a) a fixed retainer fixedly provided in said one of said driven member and said piston,
(b) a movable retainer provided to be movable relative to said one of said driven member and said piston, and
(c) a set-load defining portion which is fixedly provided in said one of said driven member and said piston and which is configured to define a limit of movement of said movable retainer relative to said one of said driven member and said piston,
wherein said spring is disposed between a pair of retainers consisting of said fixed retainer and said movable retainer,
wherein said spring has a certain value of set load in a state in which the limit of the movement of said movable retainer is defined by said set-load defining portion, such that the certain value of set load is large enough to avoid said spring from being elastically deformed in an assumed case where said piston is moved rearwardly together with rearward movement of said driven member, and
wherein said fixed retainer, said set-load defining portion, said movable retainer and said spring cooperate to constitute said engaging portion.

4. The brake apparatus according to claim 2,
wherein said piston and said driven member overlap with each other in a radial direction of said piston, and
wherein said engaged portion, which is provided in said other of said driven member and said piston, protrudes in said radial direction.

5. The brake apparatus according to claim 1,
wherein said piston is slidably fitted in a cylinder main body that constitutes a part of a caliper, and
wherein said brake is a built-in disk brake.

6. The brake apparatus according to claim 1,
wherein said power drive device includes
(a) an electric motor, and
(b) a motion converting mechanism configured to convert a rotary motion of said electric motor into a linear motion of said driven member,
said brake apparatus comprising:
an electric current sensor configured to detect a value of an electric current flowing through said electric motor; and
an electric-motor control device configured to control activation of said driven member, by controlling said electric motor on the basis of the value of the electric current detected by said electric current sensor.

7. The brake apparatus according to claim 6, wherein said electric-motor control device includes a retraction-movement controlling portion that is configured, during a rearward movement of said driven member, to control said electric motor, such that said driven member is moved rearwardly by a given first stroke distance from a point of time at which said driven member and said piston are brought into engagement with each other through said engaging portion, and such that said driven member is stopped after having been moved rearwardly by the given first stroke distance.

8. The brake apparatus according to claim 7, wherein said retraction-movement controlling portion includes a retraction-start detecting portion that is configured to detect that said driven member and said piston have been brought into engagement with each other through said engaging portion, when the value of the electric current detected by said electric current sensor has been increased by at least a given first width.

9. The brake apparatus according to claim 6,
wherein said engaged portion which is provided in said other of said driven member and said piston is disposed such that, in a state in which said driven member and said piston are in contact with each other, said engaged portion and said engaging portion cooperate with each other to define said clearance therebetween in said axial direction,
and wherein said electric-motor control device includes a no-load rearward-movement detecting portion that is configured, during a rearward movement of said driven member, to detect that there is being established a no-load rearward-movement state in which said driven member is moved, within said clearance, rearwardly relative to said piston while said piston is being stopped.

10. The brake apparatus according to claim 6, wherein said piston is slidably fitted in a cylinder main body that constitutes a part of a caliper,
wherein said cylinder main body includes a stopper that defines a rearward end position of said piston, and
wherein said electric-motor control device includes a reattempt controlling portion that is configured, during the release of the application of said brake, to control said electric motor such that a rotational direction of said electric motor is inverted upon contact of said piston with said stopper and such that said driven member is stopped after separation of said piston from said stopper.

11. The brake apparatus according to claim 10,
wherein said engaged portion which is provided in said other of said driven member and said piston is disposed such that, in a state in which said driven member and said piston are in contact with each other, said engaged portion and said engaging portion cooperate to define said clearance therebetween in said axial direction, and
wherein said reattempt controlling portion includes:
- (a) a no-load forward-movement detecting portion that is configured to detect that there is being established a no-load forward-movement state in which said driven member is moved forwardly relative to said piston without a load being applied to said electric motor while said piston being separated from said stopper, when the value of the electric current detected by said electric current sensor has been reduced to be not higher than a given second value; and
- (b) a first reattempt controlling portion that is configured to control said electric motor such that said driven member is moved forwardly by a given second stroke distance from a point of time at which the no-load forward-movement state has been detected by said no-load forward-movement detecting portion, and such that said driven member is stopped after having been moved forwardly by the given second stroke distance.

12. The brake apparatus according to claim 10,
wherein said engaged portion which is provided in said other of said driven member and said piston is disposed such that, in a state in which said driven member and said piston are in contact with each other, said engaged portion and said engaging portion cooperate with each other to define said clearance therebetween in said axial direction, and
wherein said reattempt controlling portion includes:
- (a) a forward-contact detecting portion configured to detect that said driven member has been brought into contact with said piston as a result of forward movement of said driven member, when the value of the electric current detected by said electric current sensor has been increased by at least a given second width; and
- (b) a second reattempt controlling portion configured to control said electric motor such that said driven member is stopped at a point of time at which the contact of said driven member with said piston is detected by said forward-contact detecting portion.

13. The brake apparatus according to claim 1,
wherein said power drive device includes
- (a) an electric motor, and
- (b) a motion converting mechanism configured to convert a rotary motion of said electric motor into a linear motion of said driven member, and
wherein said piston is to be activated by a fluid pressure in a brake cylinder, said brake apparatus comprising:
a brake-fluid-pressure sensor that is configured to detect a value of the fluid pressure in said brake cylinder; and
an electric-motor control device that is configured to control activation of said driven member, by controlling said electric motor on the basis of the value of the fluid pressure detected by said brake-fluid-pressure sensor.

\* \* \* \* \*